(12) United States Patent
Teramoto et al.

(10) Patent No.: US 9,614,257 B2
(45) Date of Patent: Apr. 4, 2017

(54) SECONDARY BATTERY CELL, BATTERY PACK, AND POWER CONSUMPTION DEVICE

(75) Inventors: Shigeki Teramoto, Tokyo (JP); Atsushi Ozawa, Tokyo (JP); Kazuo Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 529 days.

(21) Appl. No.: 13/988,097

(22) PCT Filed: Nov. 17, 2011

(86) PCT No.: PCT/JP2011/077112
§ 371 (c)(1),
(2), (4) Date: Jul. 26, 2013

(87) PCT Pub. No.: WO2012/070635
PCT Pub. Date: May 31, 2012

(65) Prior Publication Data
US 2013/0295421 A1    Nov. 7, 2013

(30) Foreign Application Priority Data
Nov. 26, 2010   (JP) .................. 2010-263351

(51) Int. Cl.
*H01M 10/48*    (2006.01)
*H01M 10/02*    (2006.01)
(Continued)

(52) U.S. Cl.
CPC ............ *H01M 10/48* (2013.01); *G06F 21/81* (2013.01); *H01M 10/02* (2013.01);
(Continued)

(58) Field of Classification Search
CPC .......... H01M 10/48; H01M 2/34; H01M 2/341
See application file for complete search history.

(56) References Cited

U.S. PATENT DOCUMENTS

2006/0244459 A1    11/2006   Katzenberger
2008/0213659 A1*    9/2008   Yamada ............... H01M 2/0212
429/181
(Continued)

FOREIGN PATENT DOCUMENTS

EP    268142 A2    5/1988
EP    417447 A2    3/1991
(Continued)

OTHER PUBLICATIONS

International Search Report prepared by the Japanese Patent Office on Feb. 28, 2012, for International Application No. PCT/JP2011/077112.

*Primary Examiner* — Scott J Chmielecki
(74) *Attorney, Agent, or Firm* — Chip Law Group

(57) ABSTRACT

Provided is a secondary battery cell capable of reliably preventing an integrated circuit provided to the secondary battery cell from being removed from the secondary battery cell.
A secondary battery cell (20) includes an integrated circuit (IC chip) (50) that stores identification information (for example, identification number (ID number) given to the integrated circuit itself). The integrated circuit (50) includes a wiring abnormality detection circuit. When the integrated circuit (50) is removed from the secondary battery cell (20), the wiring abnormality detection circuit detects a wiring abnormality.

10 Claims, 27 Drawing Sheets

(51) Int. Cl.
  *H01M 10/42* (2006.01)
  *G06F 21/81* (2013.01)
  *H01M 2/34* (2006.01)

(52) U.S. Cl.
  CPC ............ *H01M 10/425* (2013.01); *H01M 2/34* (2013.01); *H01M 2/341* (2013.01)

(56) References Cited

U.S. PATENT DOCUMENTS

| | | | | |
|---|---|---|---|---|
| 2009/0221262 | A1* | 9/2009 | Miwa | G08B 25/016 455/404.1 |
| 2009/0309545 | A1* | 12/2009 | Kunimitsu | G01R 31/3658 320/118 |
| 2010/0157495 | A1* | 6/2010 | Densham | H01M 10/42 361/56 |
| 2011/0104520 | A1* | 5/2011 | Ahn | H01M 2/22 429/7 |
| 2012/0112755 | A1* | 5/2012 | Nishizawa | G01R 31/362 324/433 |
| 2012/0236453 | A1* | 9/2012 | Nishizawa | H02H 7/18 361/86 |
| 2013/0113493 | A1* | 5/2013 | Kanno | H01M 10/48 324/426 |
| 2013/0244062 | A1* | 9/2013 | Teramoto | H01M 10/4257 429/7 |
| 2014/0152261 | A1* | 6/2014 | Yamauchi | B60L 11/1866 320/118 |
| 2014/0225622 | A1* | 8/2014 | Kudo | B60L 3/0046 324/433 |

FOREIGN PATENT DOCUMENTS

| | | |
|---|---|---|
| JP | 2006-164820 A | 6/2006 |
| JP | 2006-236806 | 9/2006 |
| JP | 2006-236806 A | 9/2006 |
| WO | WO 02/079960 A1 | 10/2002 |

* cited by examiner (A)

(B)

SECONDARY BATTERY CELL, BATTERY PACK, AND POWER CONSUMPTION DEVICE

CROSS REFERENCE TO RELATED APPLICATIONS

This application is a national stage application under 35 U.S.C. 371 and claims the benefit of PCT Application No. PCT/JP2011/077112 having an international filing date of 17 Nov. 2011, which designated the United States, and which PCT application claimed the benefit of Japanese Patent Application No. 2010-263351 filed Nov. 26, 2010, the disclosure of which is incorporated herein by reference.

TECHNICAL FIELD

The present invention relates to a secondary battery cell, a battery pack, and a power consumption device.

BACKGROUND ART

Battery packs have been already used in various portable devices such as mobile phones, digital still cameras, portable game machines, laptop personal computers, and electric tools. And now, besides them, battery packs are being used in the fields requiring a higher output and a higher capacity, such as electric power-assisted bicycles, electric cars, and, further, household electric storage apparatuses.

One of secondary battery cells that are most dominantly used now as a secondary battery cell incorporated in a battery pack is a lithium-ion secondary battery cell. The lithium-ion secondary battery cell is very widely used due to a number of features such as being repeatedly usable by charging, having a high voltage output, having a high energy density, having a small amount of self-discharge, and having a long lifetime. Further, in order to meet a demand for a device with a higher output and a higher capacity, there are increasing cases where many secondary battery cells (unit cells) are connected in series or parallel to be used in the mode of an assembled battery. Such a method for use has a great advantage. However, an amount of energy to be treated becomes very huge, and therefore it is necessary to be further more careful in the handling than in the past.

In order to determine whether or not a battery pack mounted to a power consumption device is one that can be used safely for the power consumption device, many battery authentication systems for authenticating a secondary battery cell provided to a battery pack have been introduced. The technology of reading out individual identification information such as an ID number from a secondary battery cell including a wireless IC tag (integrated circuit) is well-known from Japanese Patent Application Laid-open No. 2006-236806, for example.

PRIOR ART DOCUMENT

Patent Document

Patent Document 1: Japanese Patent Application Laid-open No. 2006-236806

SUMMARY OF INVENTION

Problem to be Solved by the Invention

Incidentally, in the wireless IC tag (integrated circuit) disclosed in Japanese Patent Application Laid-open No. 2006-236806, when the wireless IC tag is peeled off, a groove portion between a memory unit and a wireless transmission/reception unit of the wireless IC tag is disconnected, that is, a circuit configuration of the wireless IC tag is divided and broken by the peeling. However, it is not impossible to peel off the wireless IC tag in such a way that the groove portion between the memory unit and the wireless transmission/reception unit of the wireless IC tag is not disconnected. In the case where such a situation occurs, there arises a problem that it is difficult to prevent the wireless IC tag from being removed from the secondary battery cell and attached to another secondary battery cell. Further, in the case where the groove portion between the memory unit and the wireless transmission/reception unit of the wireless IC tag is designed to be easily disconnected, there is a fear that an accident in which the groove portion between the memory unit and the wireless transmission/reception unit is disconnected occurs frequently in the manufacturing of the wireless IC tag.

Therefore, it is an object of the present invention to provide a secondary battery cell capable of reliably preventing an integrated circuit provided to the secondary battery cell from being removed from the secondary battery cell to be used for another secondary battery cell, a battery pack including the secondary battery cell, and a power consumption device including the battery pack.

Means for Solving the Problem

A secondary battery cell according to a first embodiment of the present invention for achieving the above-mentioned object includes an integrated circuit (IC chip) that stores identification information. The integrated circuit includes a wiring abnormality detection circuit, and when the integrated circuit is removed from the secondary battery cell, the wiring abnormality detection circuit detects a wiring abnormality. Here, in the secondary battery cell according to the first embodiment of the present invention, the wiring abnormality detection circuit can be formed of a signal generation circuit and a comparison circuit, though not limited thereto.

A secondary battery cell according to a second embodiment of the present invention for achieving the above-mentioned object includes an integrated circuit (IC chip) that stores identification information. The integrated circuit includes a photodetection means, and when the integrated circuit is removed from the secondary battery cell, the photodetection means detects light.

A secondary battery cell according to a third embodiment of the present invention for achieving the above-mentioned object includes an integrated circuit (IC chip) that stores identification information. The integrated circuit includes a pressure detection means, and when the integrated circuit is removed from the secondary battery cell, the pressure detection means detects a change in pressure.

A secondary battery cell according to a fourth embodiment of the present invention for achieving the above-mentioned object includes an integrated circuit (IC chip) that stores identification information. The integrated circuit includes a voltage measurement means for measuring a terminal voltage of the secondary battery cell, and when the integrated circuit is removed from the secondary battery cell, the voltage measurement means detects a change in voltage. Here, in the secondary battery cell according to the fourth embodiment of the present invention, the voltage measurement means can be formed of a reference voltage generation circuit and a comparison circuit, though not limited thereto.

A secondary battery cell according to a fifth embodiment of the present invention for achieving the above-mentioned object includes an integrated circuit (IC chip) that stores identification information. The integrated circuit includes a resistance value measurement means for measuring a resistance value in the secondary battery cell, and when the integrated circuit is removed from the secondary battery cell, the resistance value measurement means detects a change in resistance value. Here, in the secondary battery cell according to the fifth embodiment of the present invention, the resistance value measurement means can be formed to measure a resistance value of an electrolytic solution in the secondary battery cell, though not limited thereto.

A secondary battery cell according to a sixth embodiment of the present invention for achieving the above-mentioned object includes an integrated circuit (IC chip) that stores identification information. The integrated circuit includes a monitor circuit that monitors a clock frequency supplied from the outside, and when the integrated circuit is removed from the secondary battery cell, the monitor circuit detects a change in clock frequency.

A secondary battery cell according to a seventh embodiment of the present invention for achieving the above-mentioned object includes: an integrated circuit (IC chip) that stores identification information; and a detection means for detecting that the integrated circuit is removed from the secondary battery cell.

A battery pack of the present invention for achieving the above-mentioned object includes a plurality of secondary battery cells according to the first embodiment to the seventh embodiment of the present invention including a preferred mode. CL16 A power consumption device of the present invention for achieving the above-mentioned object includes a battery pack including a plurality of secondary battery cells according to the first embodiment to the seventh embodiment of the present invention including a preferred mode.

Effect of the Invention

In the secondary battery cell according to the first embodiment of the present invention, the secondary battery cell according to the first embodiment of the present invention in the battery pack of the present invention, or the secondary battery cell according to the first embodiment of the present invention in the power consumption device of the present invention (hereinafter, those secondary battery cells are collectively referred to as "a secondary battery cell and the like according to the first embodiment of the present invention" in some cases), the wiring abnormality detection circuit that detects a wiring abnormality is provided.

Further, in the secondary battery cell according to the second embodiment of the present invention, the secondary battery cell according to the second embodiment of the present invention in the battery pack of the present invention, or the secondary battery cell according to the second embodiment of the present invention in the power consumption device of the present invention (hereinafter, those secondary battery cells are collectively referred to as "a secondary battery cell and the like according to the second embodiment of the present invention" in some cases), the photodetection means that detects light is provided.

Further, in the secondary battery cell according to the third embodiment of the present invention, the secondary battery cell according to the third embodiment of the present invention in the battery pack of the present invention, or the secondary battery cell according to the third embodiment of the present invention in the power consumption device of the present invention (hereinafter, those secondary battery cells are collectively referred to as "a secondary battery cell and the like according to the third embodiment of the present invention" in some cases), the pressure detection means for detecting a change in pressure is provided.

Further, in the secondary battery cell according to the fourth embodiment of the present invention, the secondary battery cell according to the fourth embodiment of the present invention in the battery pack of the present invention, or the secondary battery cell according to the fourth embodiment of the present invention in the power consumption device of the present invention (hereinafter, those secondary battery cells are collectively referred to as "a secondary battery cell and the like according to the fourth embodiment of the present invention" in some cases), the voltage measurement means for detecting a change in voltage is provided.

Further, in the secondary battery cell according to the fifth embodiment of the present invention, the secondary battery cell according to the fifth embodiment of the present invention in the battery pack of the present invention, or the secondary battery cell according to the fifth embodiment of the present invention in the power consumption device of the present invention (hereinafter, those secondary battery cells are collectively referred to as "a secondary battery cell and the like according to the fifth embodiment of the present invention" in some cases), the resistance value measurement means for detecting a change in resistance value is provided.

Further, in the secondary battery cell according to the sixth embodiment of the present invention, the secondary battery cell according to the sixth embodiment of the present invention in the battery pack of the present invention, or the secondary battery cell according to the sixth embodiment of the present invention in the power consumption device of the present invention (hereinafter, those secondary battery cells are collectively referred to as "a secondary battery cell and the like according to the sixth embodiment of the present invention" in some cases), the monitor circuit that detects a change in clock frequency is provided.

Further, in the secondary battery cell according to the seventh embodiment of the present invention, the secondary battery cell according to the seventh embodiment of the present invention in the battery pack of the present invention, or the secondary battery cell according to the seventh embodiment of the present invention in the power consumption device of the present invention (hereinafter, those secondary battery cells are collectively referred to as "a secondary battery cell and the like according to the seventh embodiment of the present invention" in some cases), the detection means is provided.

Thus, it is possible to reliably detect that the integrated circuit provided to the secondary battery cell is removed from the secondary battery cell. Therefore, it is possible to reliably prevent the integrated circuit from being attached to another secondary battery cell. In addition, since the integrated circuit stores identification information (for example, identification number (ID number) given to the integrated circuit itself), it is possible to easily and reliably authenticate a secondary battery cell provided to a battery pack mounted to a power consumption device.

BRIEF DESCRIPTION OF DRAWINGS (A), (B), and (C) of FIG. 1 are a schematic perspective view of a secondary battery cell of Example 1, a schematic partial end view of an integrated circuit and the like, and a schematic partial plan view of shielding wiring.

FIG. 2 is a block diagram of a wiring abnormality detection circuit in Example 1.

(A) and (B) of FIG. 3 are block diagrams of integrated circuits in Example 1 and Example 2.

FIG. 4 is a diagram showing a connection state of secondary battery cells in a battery pack of Example 1.

(A) and (B) of FIG. 5 are a schematic perspective view of the battery pack and a schematic view of a state in which a lid of the battery pack is removed.

FIG. 6 is a schematic end view of the secondary battery cell of Example 1.

(A), (B), and (C) of FIG. 7 are schematic partial cross-sectional views and a schematic partial plan view of a secondary battery cell and the like in a modified example of the secondary battery cell of Example 1.

(A) and (B) of FIG. 8 are block diagrams of integrated circuits in Example 3 and its modified example.

FIG. 9 is a schematic perspective view of a secondary battery cell of Example 4.

(A) and (B) of FIG. 10 are a schematic perspective view of a modified example of the secondary battery cell of Example 4 and a schematic view of an aggregate of an integrated circuit and an antenna.

Figure 14:
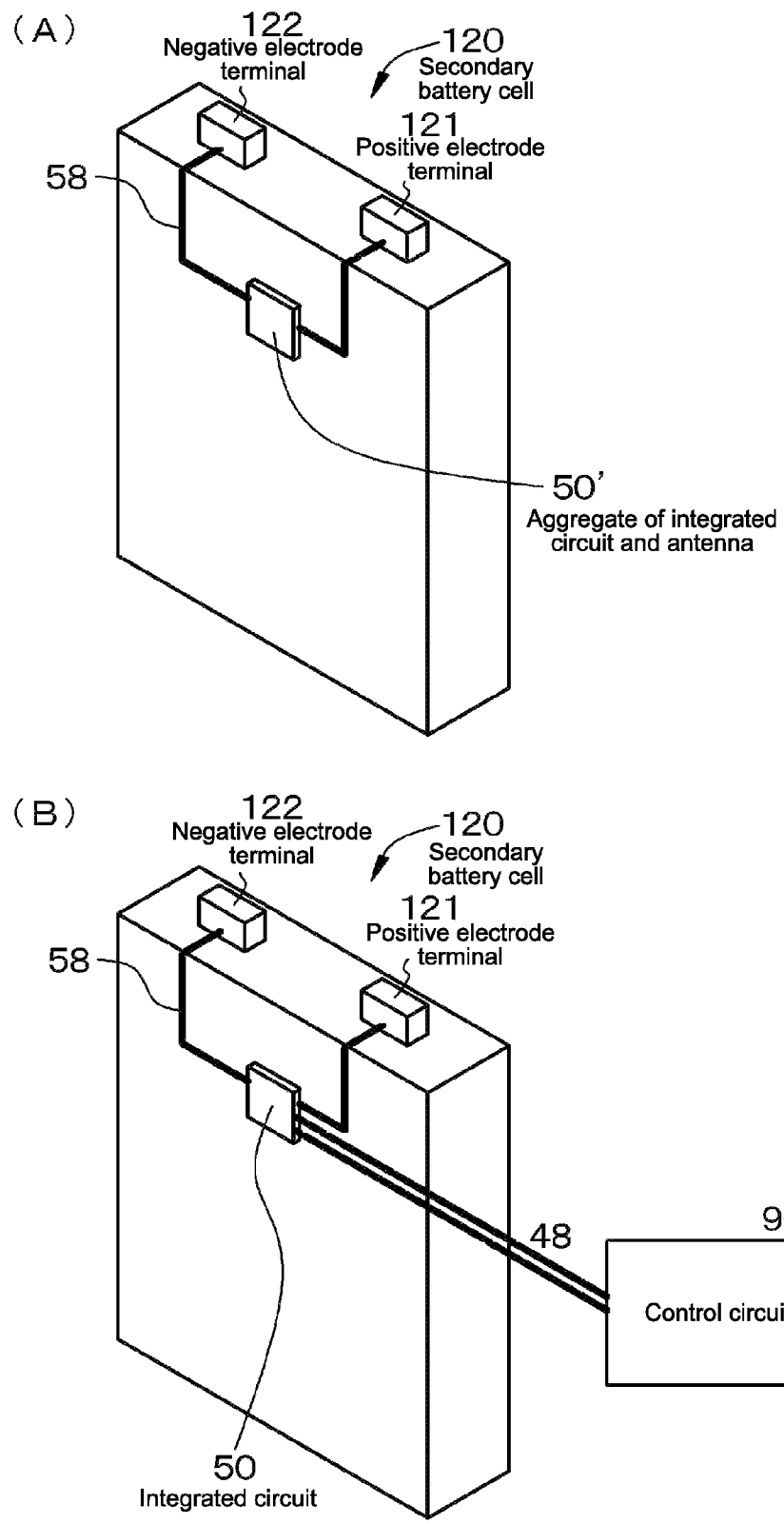

(A) and (B) of FIG. 14 are each a schematic perspective view of a secondary battery cell of Example 6.

Figure 15:
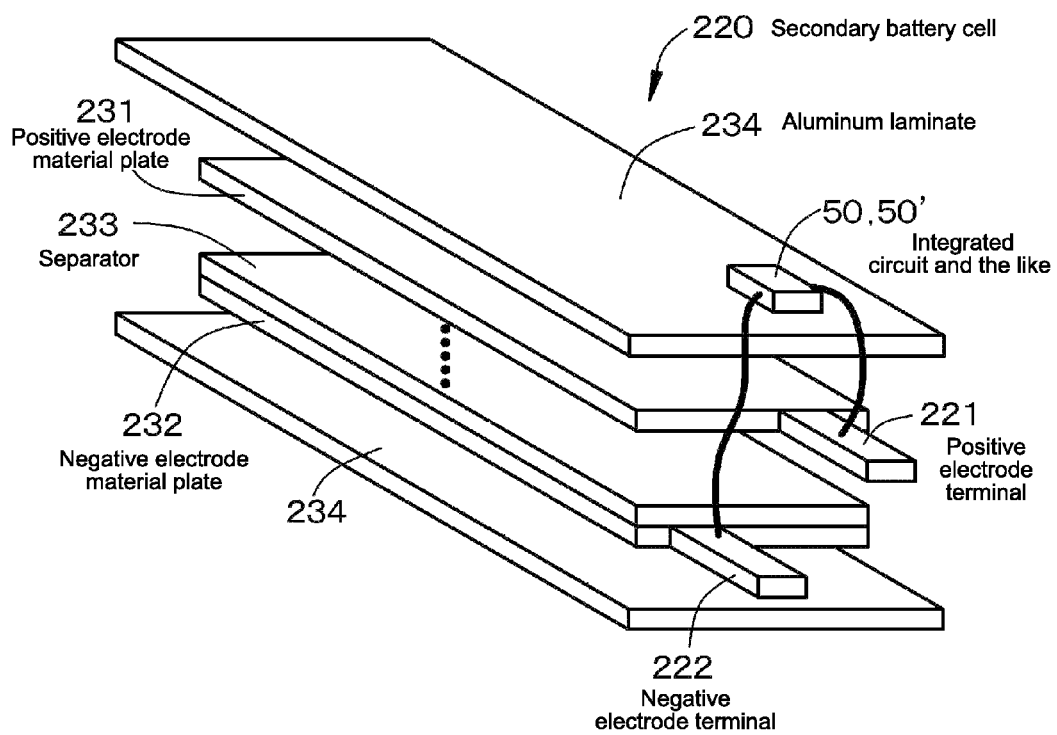

FIG. 15 is a schematic perspective view of a modified example of the secondary battery cell of Example 6.

Figure 16:
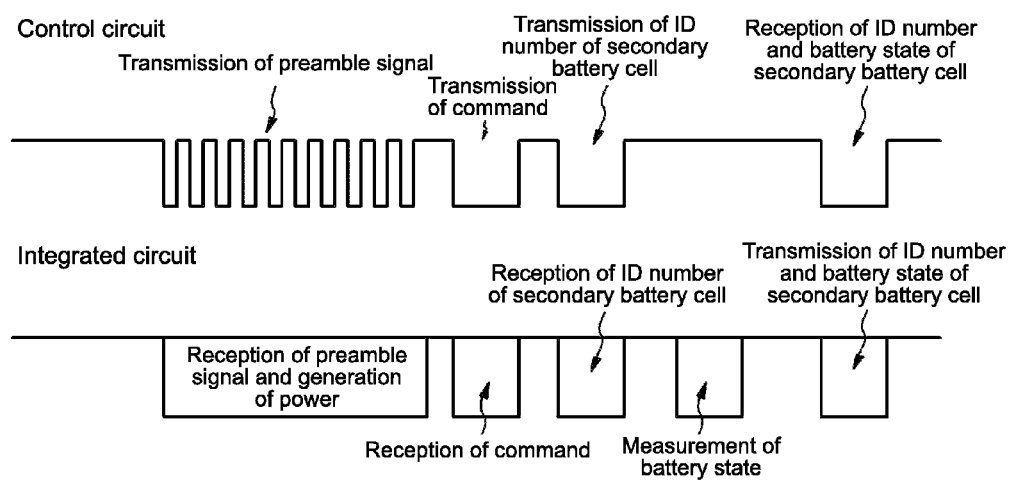

FIG. 16 is a diagram schematically showing electrical signals in communication processing between an integrated circuit and a control circuit in Example 7.

Figure 17:
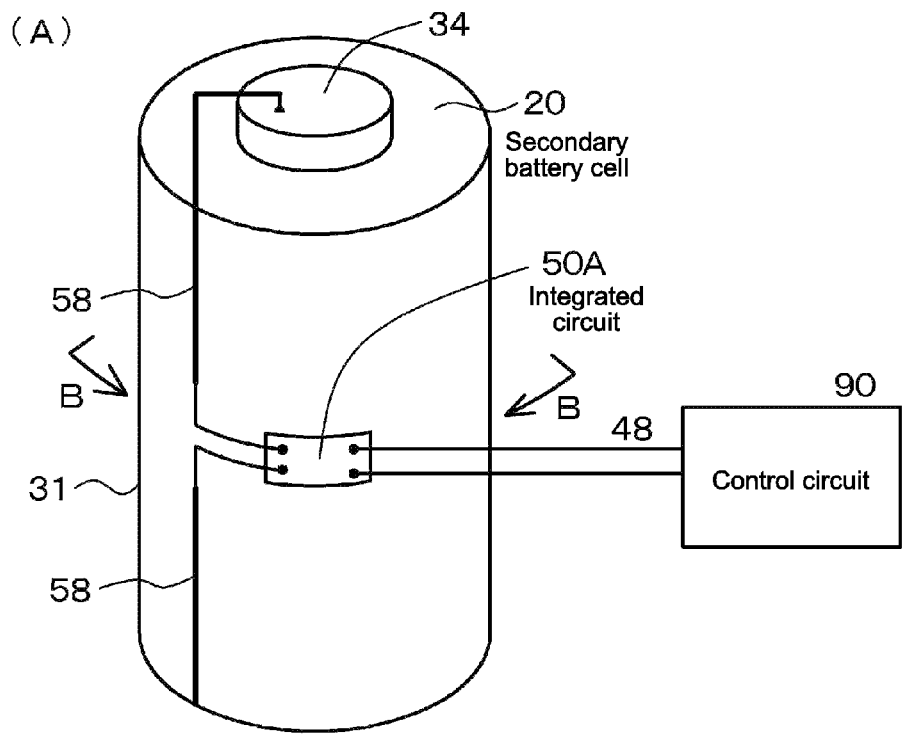
Figure 17:
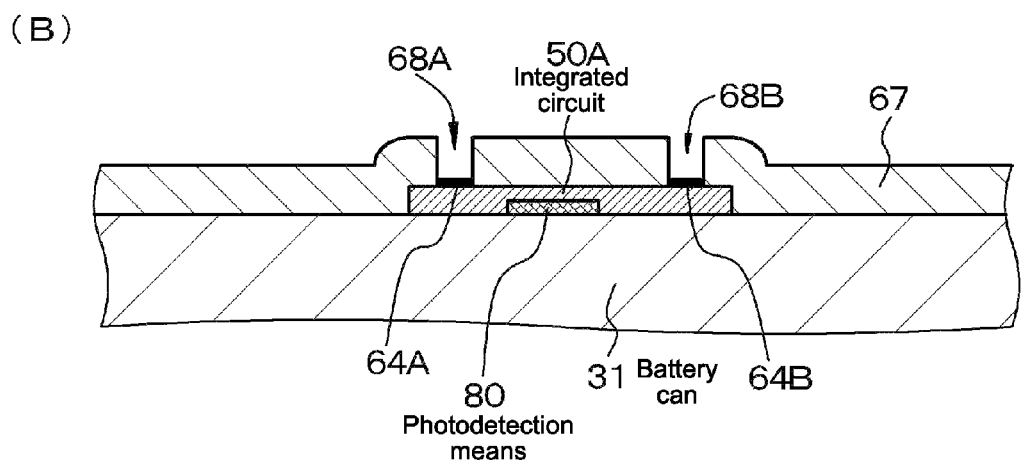

(A) and (B) of FIG. 17 are a schematic perspective view of a secondary battery cell of Example 8 and a schematic partial end view of an integrated circuit and the like.

Figure 18:
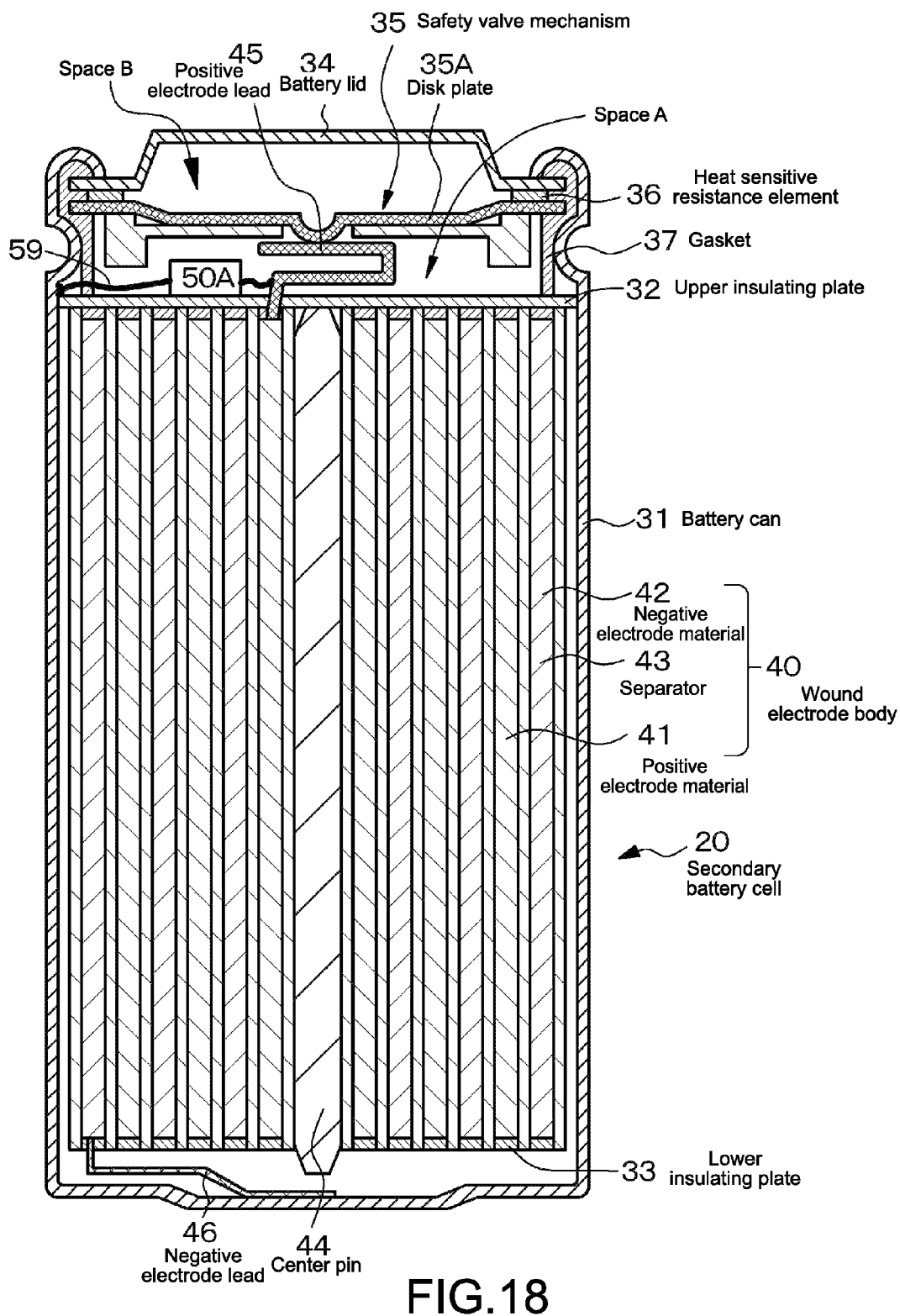

FIG. 18 is a schematic end view of a modified example of the secondary battery cell of Example 8.

Figure 19:
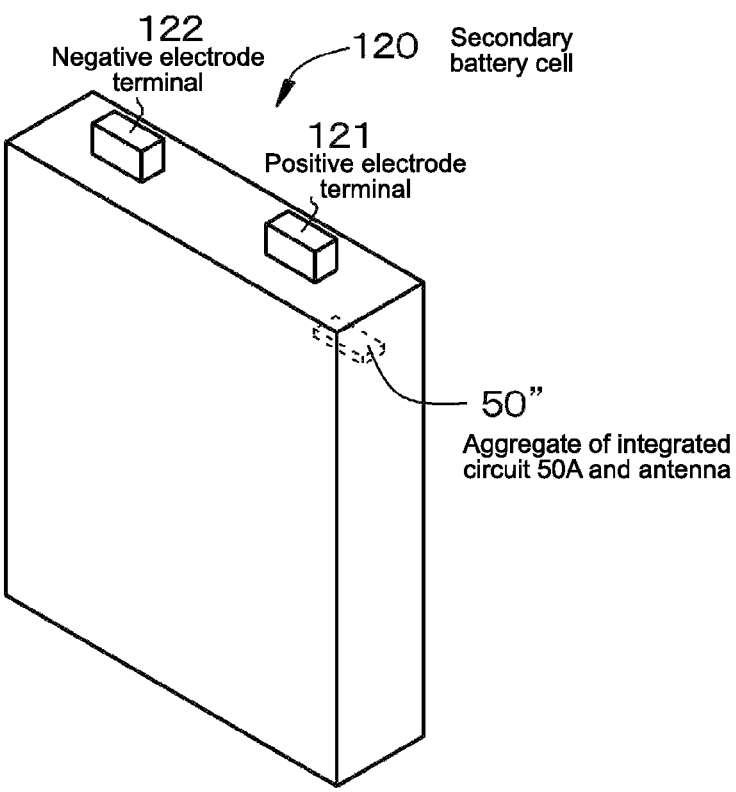
Figure 19:
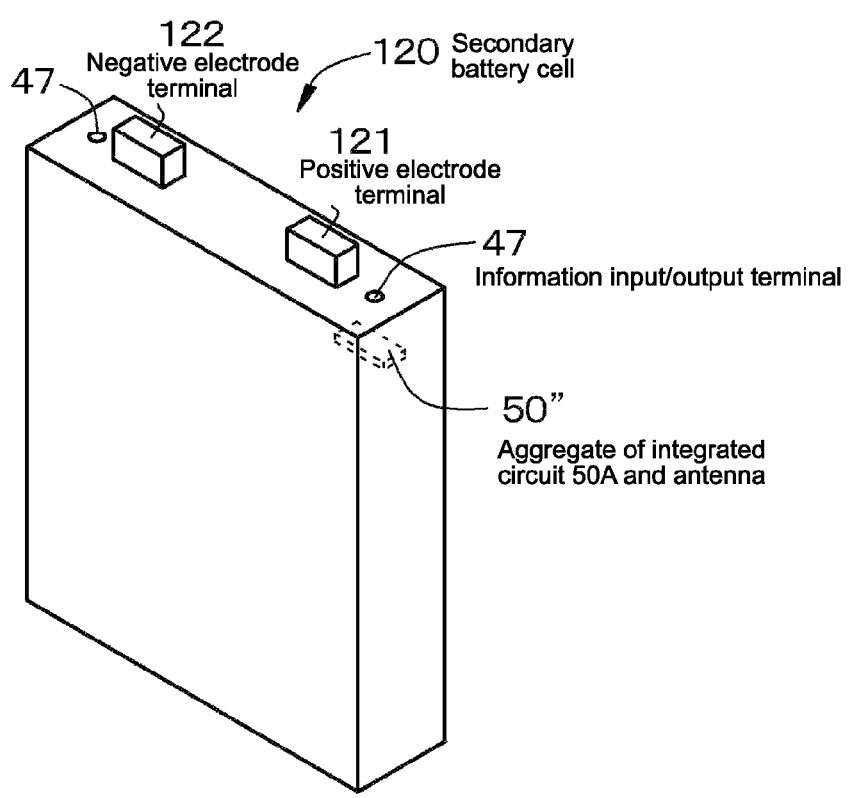

(A) and (B) of FIG. 19 are each a schematic perspective view of another modified example of the secondary battery cell of Example 8.

Figure 20:
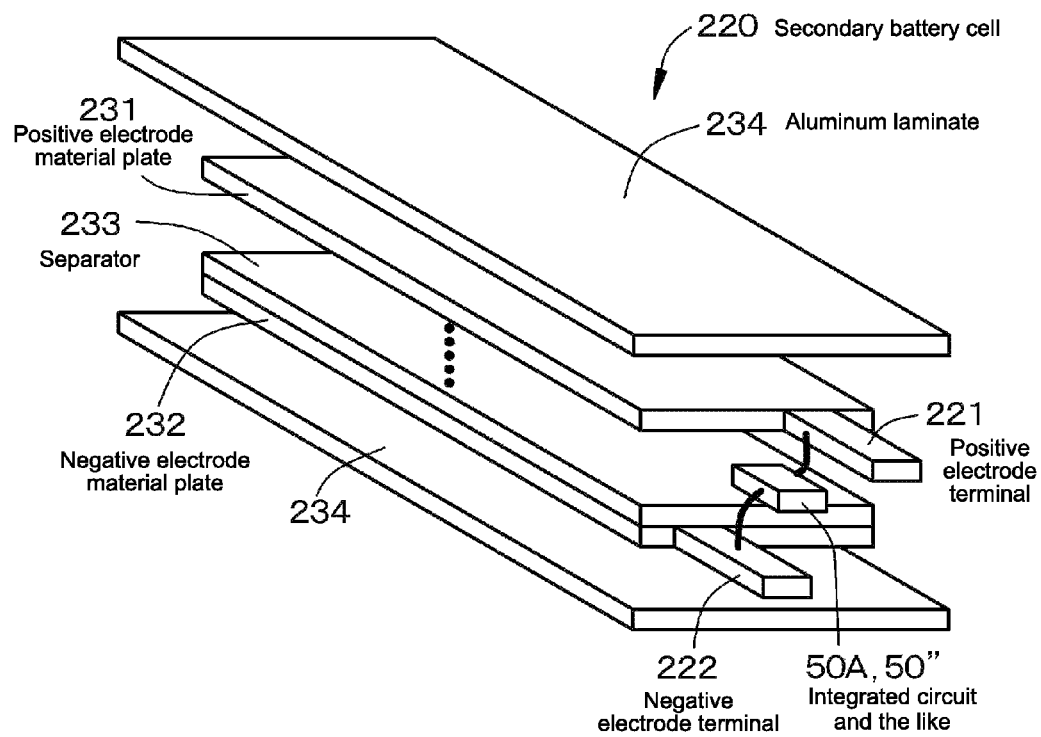

FIG. 20 is a schematic exploded perspective view of still another modified example of the secondary battery of Example 8.

Figure 21:
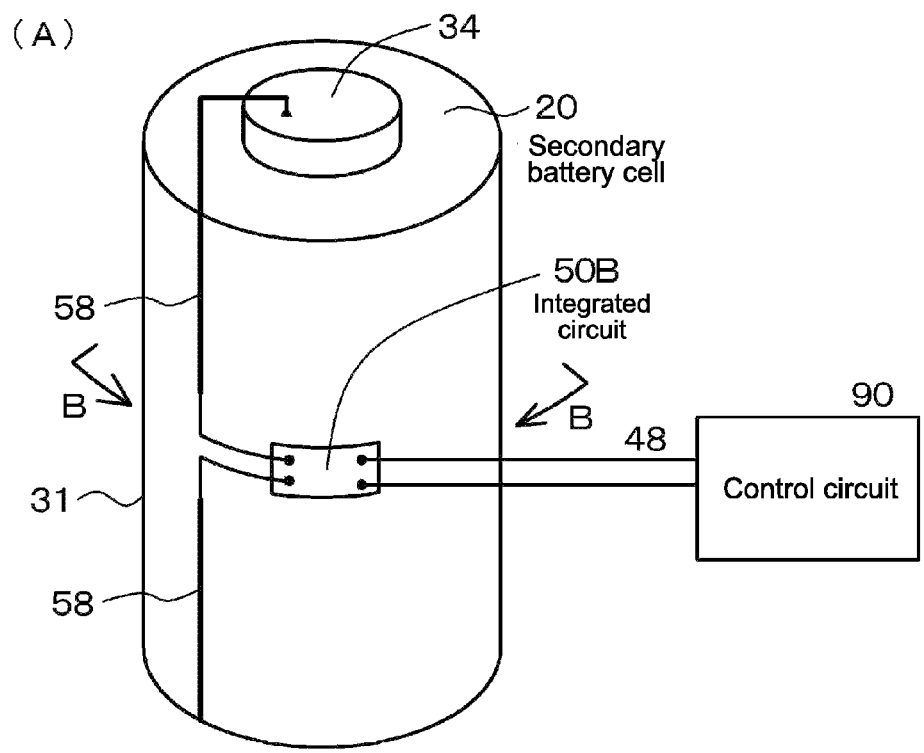
Figure 21:
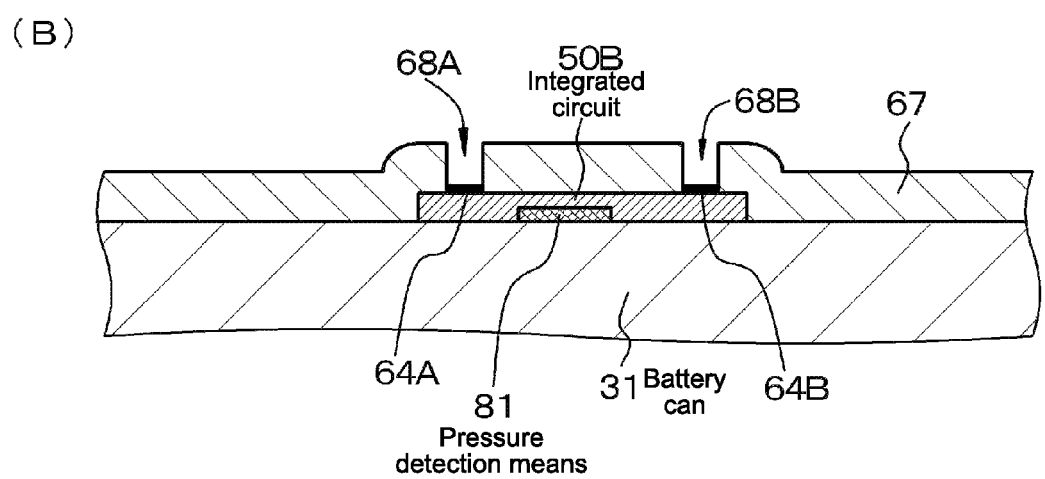

(A) and (B) of FIG. 21 are a schematic perspective view of a secondary battery cell of Example 9 and a schematic partial end view of an integrated circuit and the like.

Figure 22:
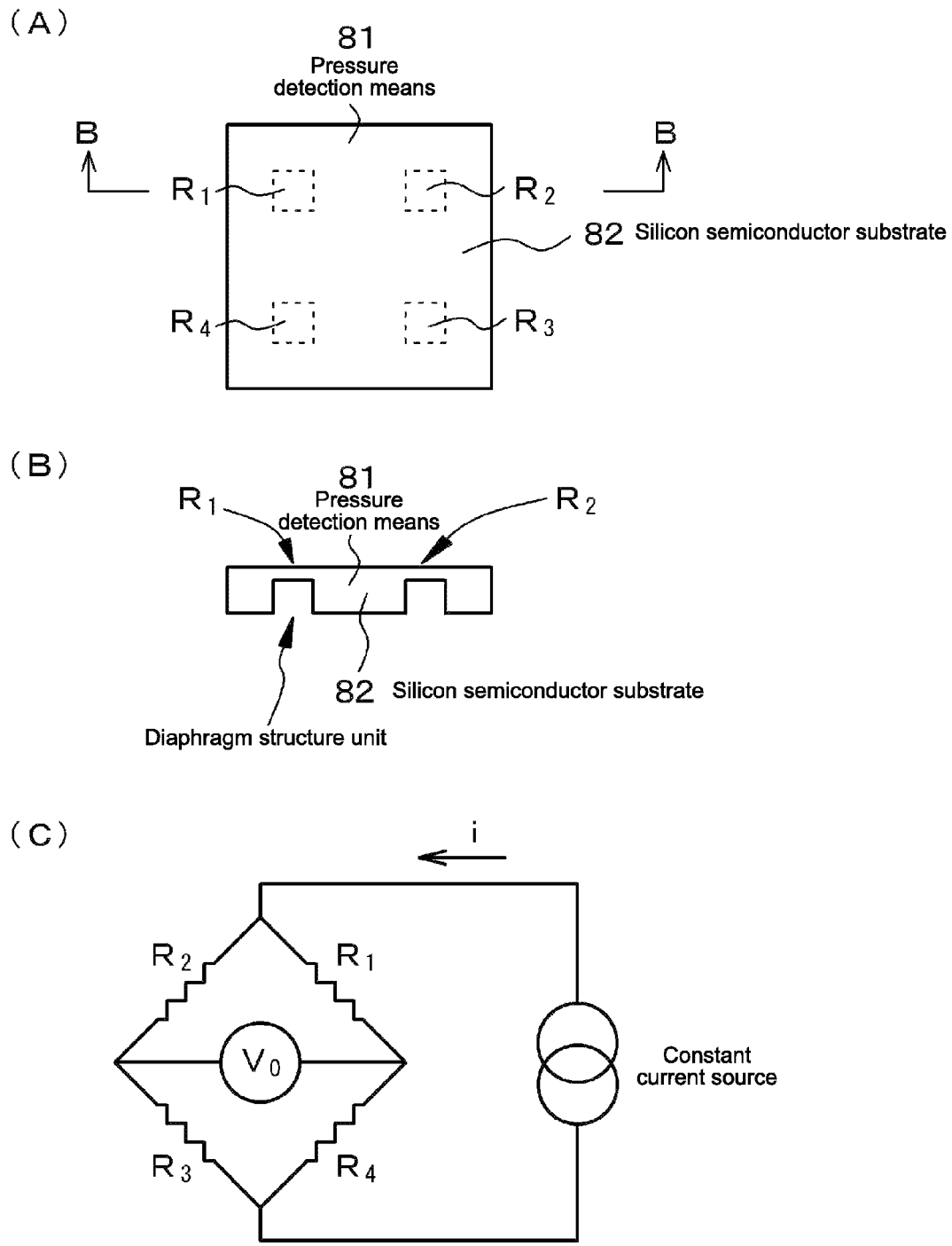

(A), (B), and (C) of FIG. 22 are a schematic plan view and a schematic end view of a pressure detection means in the secondary battery cell of Example 9 and a circuit diagram for pressure detection.

Figure 23:
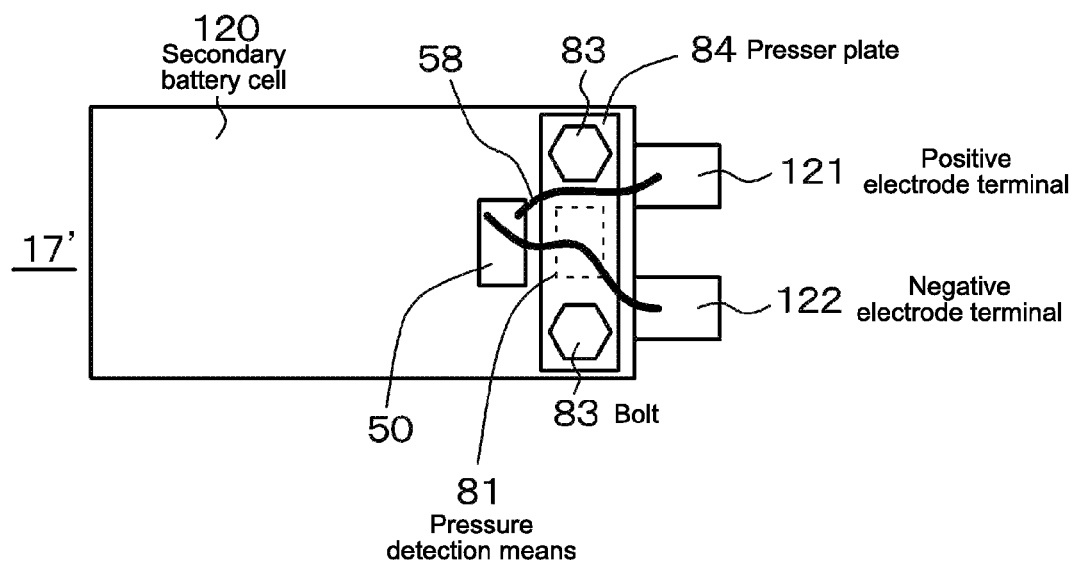

FIG. 23 is a schematic partial plan view of a secondary battery cell and the like for describing a modified example of the secondary battery cell of Example 9.

Figure 24:
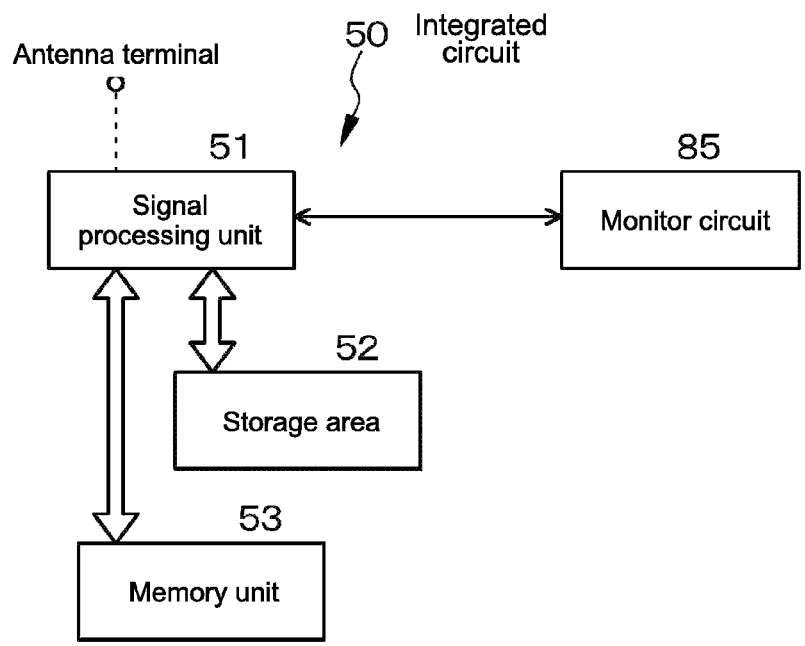
Figure 24:
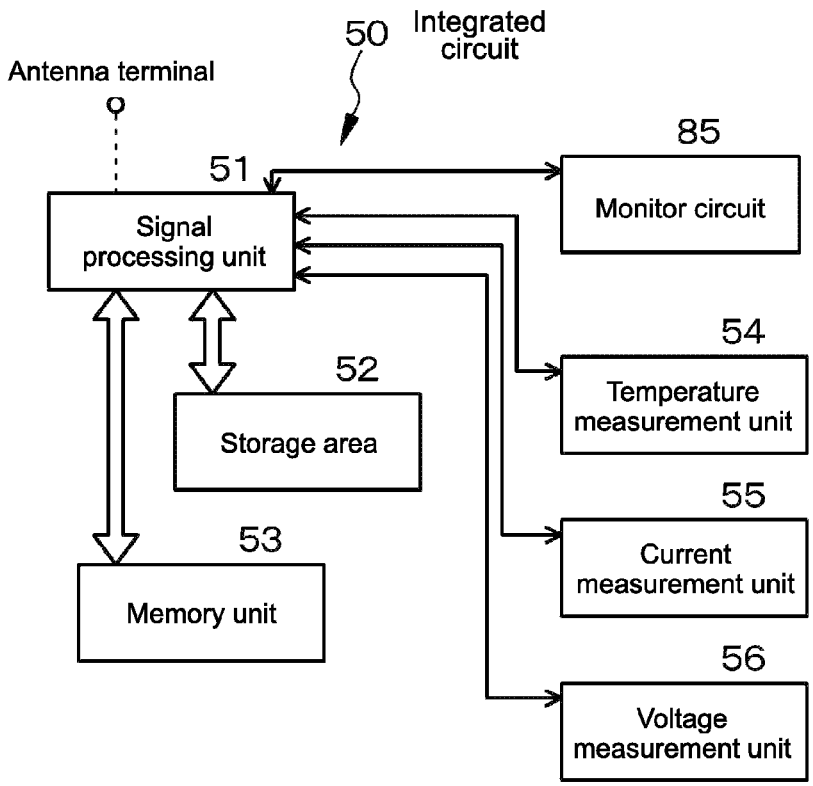

(A) and (B) of FIG. 24 are each a block diagram of an integrated circuit in Example 12.

Figure 25:
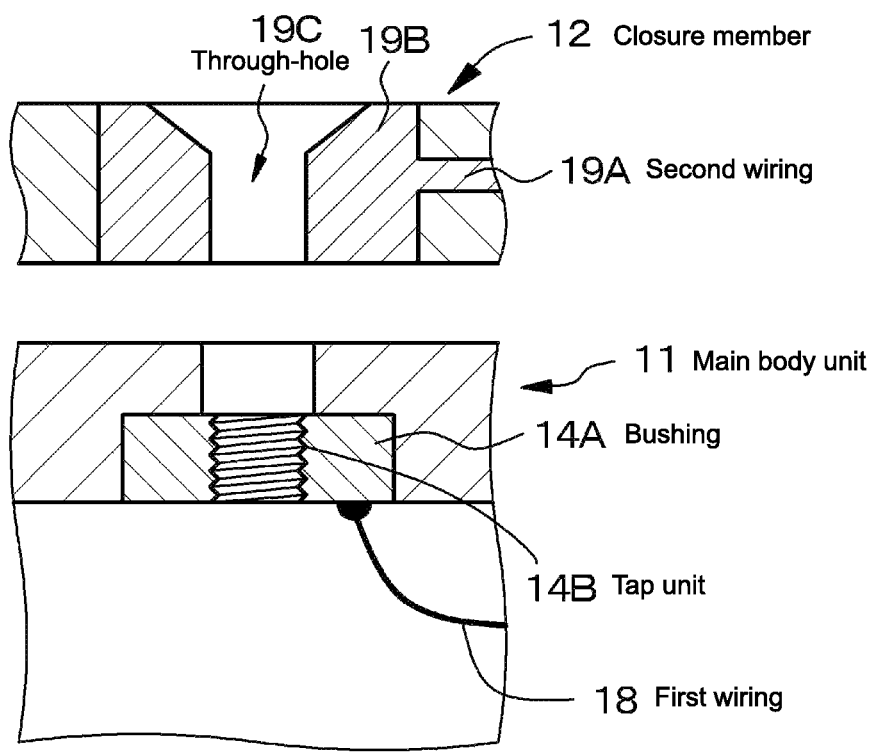
Figure 25:
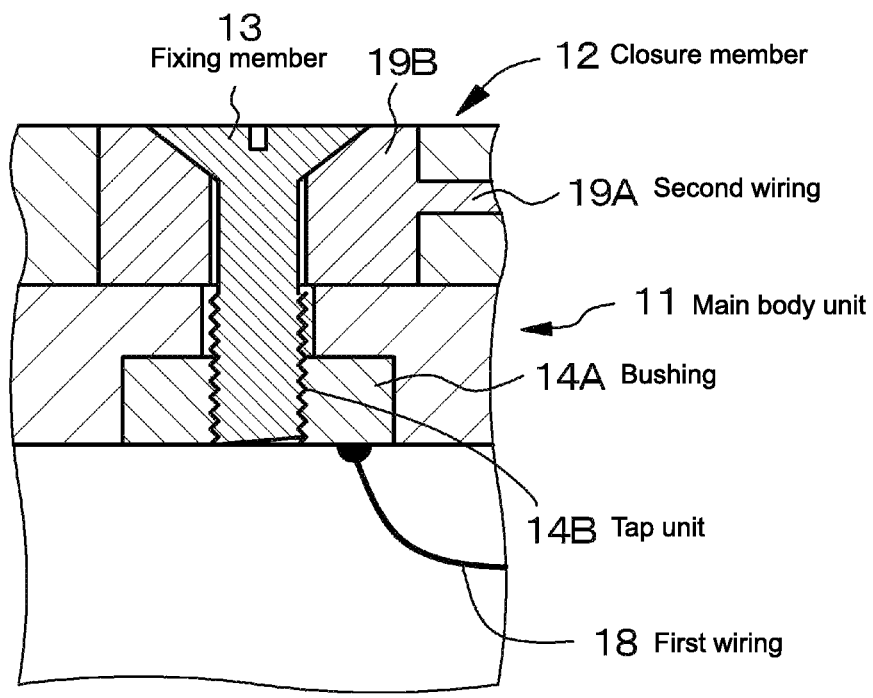

(A) and (B) of FIG. 25 are each a schematic partial cross-sectional view of a modified example of a main body unit, a closure member, and the like of a battery pack.

Figure 26:
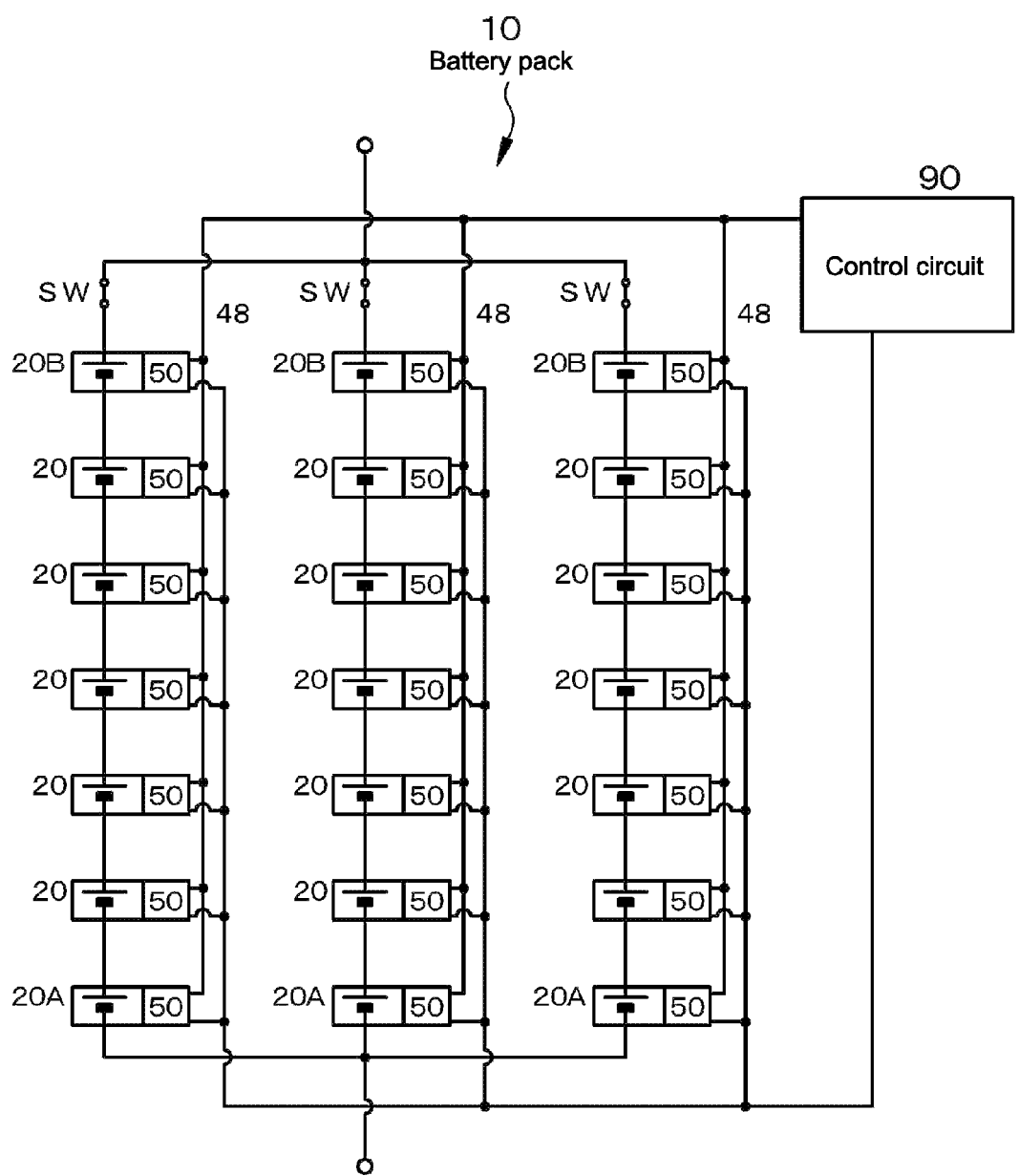

FIG. 26 is a diagram showing a connection state of secondary battery cells in a mode of a conventional battery pack.

Figure 27:
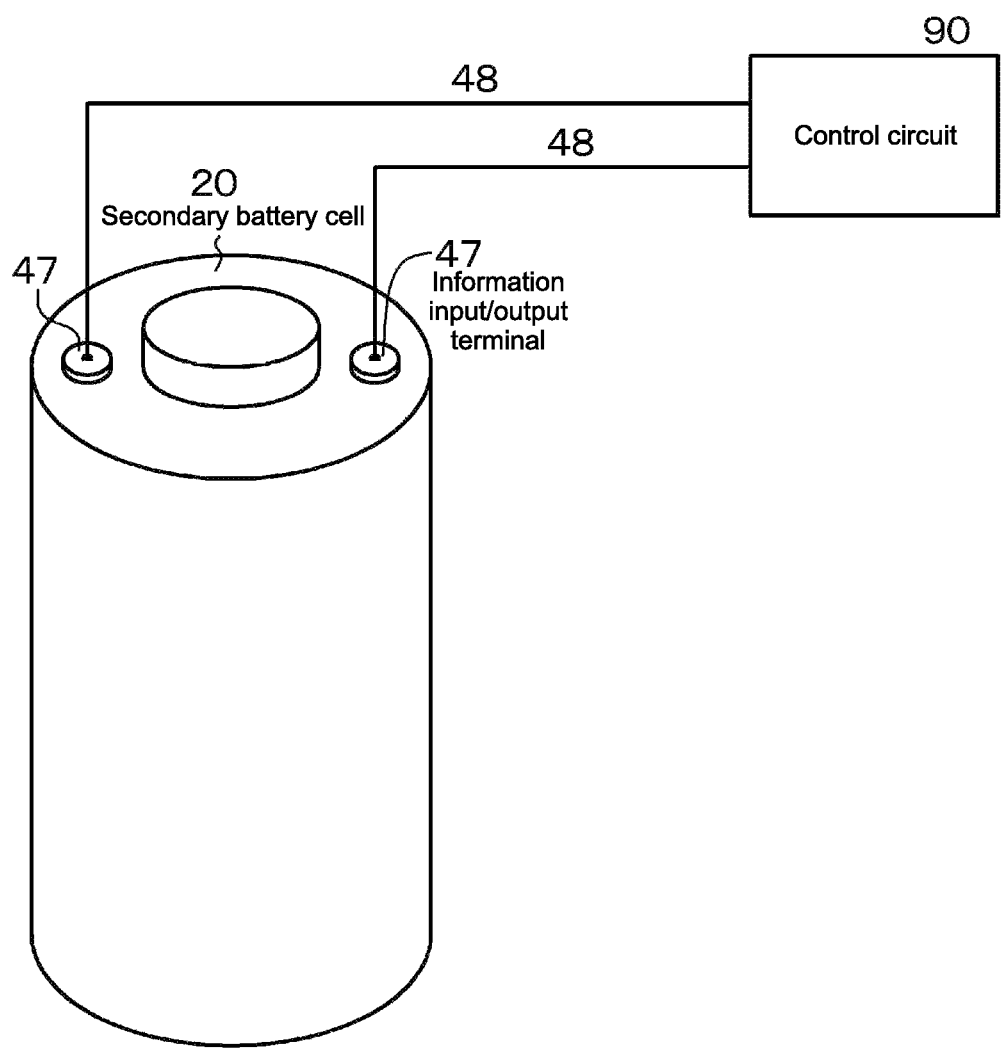

FIG. 27 is a schematic end view of a secondary battery cell in a mode of a conventional battery pack.

MODES FOR CARRYING OUT THE INVENTION

Hereinafter, the present invention will be described based on Examples with reference to the drawings. However, the present invention is not limited to Examples, and various numerical values and materials in Examples are exemplifications. It should be noted that the description is given in the following order.
1. Overall description on secondary battery cell according to first embodiment to seventh embodiment of the present invention, battery pack, and power consumption device
2. Example 1 (secondary battery cell according to first embodiment and seventh embodiment of the present invention, battery pack, and power consumption device)
3. Example 2 (modification of Example 1)
4. Example 3 (another modification of Example 1)
5. Example 4 (another modification of Example 1)
6. Example 5 (another modification of Example 1)
7. Example 6 (another modification of Example 1)
8. Example 7 (another modification of Example 1)
9. Example 8 (secondary battery cell according to second embodiment and seventh embodiment of the present invention, battery pack, and power consumption device)
10. Example 9 (secondary battery cell according to third embodiment and seventh embodiment of the present invention, battery pack, and power consumption device)
11. Example 10 (secondary battery cell according to fourth embodiment and seventh embodiment of the present invention, battery pack, and power consumption device)
12. Example 11 (secondary battery cell according to fifth embodiment and seventh embodiment of the present invention, battery pack, and power consumption device)
13. Example 12 (secondary battery cell according to sixth embodiment and seventh embodiment of the present invention, battery pack, and power consumption device), and others

[Overall Description on Secondary Battery Cell According to First Embodiment to Seventh Embodiment of the Present Invention, Battery Pack, and Power Consumption Device]

In a secondary battery cell and the like according to a first embodiment of the present invention, a wiring abnormality detection circuit can be formed to be connected to abnormality detection wiring or shielding wiring provided to the secondary battery cell, or in the case where an integrated circuit is provided with an antenna, the wiring abnormality detection circuit can be formed to be connected to the abnormality detection wiring or the shielding wiring provided to the secondary battery cell. It should be noted that the abnormality detection wiring, the shielding wiring, and the antenna are collectively called "shielding wiring and the like" in some cases. Here, specifically, the shielding wiring can be formed of an active shield, for example. More specifically, the shielding wiring can be formed such that a so-called guard voltage is applied thereto. Then, in such a mode, for example, the shielding wiring and the like can be formed to be disconnected to enter a non-conductive state or a short circuit state when the integrated circuit is removed from the secondary battery cell. Alternatively, the shielding wiring and the like can be formed to enter the non-conductive state or the short circuit state when the secondary battery cell is removed from a secondary battery cell fixing unit. Specifically, for example, a configuration in which the secondary battery cell is attached to the secondary battery cell fixing unit with use of a bolt and the shielding wiring and the like are connected to the bolt and a contact unit can be conceived. Then, in the state in which the bolt is attached to the secondary battery cell fixing unit, the bolt and the contact unit are in a contact state, and the shielding wiring and the like are in a conductive state. However, when the bolt is removed from the secondary battery cell fixing unit, the bolt and the contact unit enter a non-contact state, with the result that the shielding wiring and the like enter a non-conductive state. Alternatively, in the state in which the bolt is attached to the secondary battery cell fixing unit, the bolt and the contact unit are in the non-contact state, and the shielding wiring and the like are in the non-conductive state. However, when the bolt is removed from the secondary battery cell fixing unit, the bolt and the contact unit enter a contact state, with the result that the shielding wiring and the like enter the conductive state (short circuit state). There can be conceived various modes such as a mode in which the shielding wiring and the like are formed continuously over an outer surface of the secondary battery cell from above the integrated circuit, a mode in which the shielding wiring and the like are formed on the outer surface of the secondary battery cell, and a mode in which the shielding wiring and the like are formed on the outer surface of the secondary battery cell and connected to the integrated circuit via wiring or connected via wiring from a substrate onto which the integrated circuit is mounted. Then, in those modes, the forming can be performed based on the following methods, for example.

[A] A method of forming the shielding wiring and the like continuously over the outer surface of the secondary battery cell from above the integrated circuit based on a screen printing method.

[B] A method of laminating a film continuously over the outer surface of the secondary battery cell from above the integrated circuit and forming on the film the shielding wiring and the like connected to the integrated circuit, based on a screen printing method.

[C] A method of forming the shielding wiring and the like on a film by a screen printing method in advance, bonding the film onto the outer surface of the secondary battery cell from above the integrated circuit by using an appropriate means, and connecting the shielding wiring and the like and the integrated circuit.

[D] A method of forming the shielding wiring and the like onto the outer surface of the secondary battery cell based on a screen printing method and connecting the shielding wiring and the like and the integrated circuit.

[E] A method of forming the shielding wiring and the like on a film by a screen printing method in advance, bonding the film onto the outer surface of the secondary battery cell by using an appropriate means, and connecting the shielding wiring and the like and the integrated circuit.

[F] In the various modes described above, a method of forming the shielding wiring and the like not on the outer surface of the secondary battery cell but on the inside of the secondary battery cell as appropriate. It should be noted that in order to connect the shielding wiring and the like to the bolt or the contact unit, the shielding wiring and the like may be connected to the bolt or the contact unit via wiring. Depending on circumstances, the integrated circuit may be directly connected to the bolt or the contact unit via wiring. Further, the secondary battery cell is housed inside a main body unit constituting a battery pack, the main body unit is covered with a closure member, and the closure member is fixed to the main body unit with use of the bolt so that a battery pack is assembled. The bolt and the integrated circuit may be connected via wiring.

In the secondary battery cell and the like according to the first embodiment to the seventh embodiment of the present invention including the preferred modes and configurations described above, the integrated circuit includes a storage area, and the following configurations can be adopted.

[1] In a secondary battery cell and the like according to a first embodiment of the present invention, when the wiring abnormality detection circuit detects a wiring abnormality, the storage area stores information indicating that a wiring abnormality has been detected (in other words, information indicating that the integrated circuit has been removed from the secondary battery cell).

[2] In a secondary battery cell and the like according to a second embodiment of the present invention, when a photodetection means (for example, photo diode, photo transistor, or photo thyristor) detects light, the storage area stores information indicating that the integrated circuit has been removed from the secondary battery cell.

[3] In a secondary battery cell and the like according to a third embodiment of the present invention, when a pressure detection means (for example, semiconductor pressure sensor) detects a change in pressure, the storage area stores information indicating that the integrated circuit has been removed from the secondary battery cell.

[4] In a secondary battery cell and the like according to a fourth embodiment of the present invention, when a voltage measurement means detects a change in voltage, the storage area stores information indicating that the integrated circuit has been removed from the secondary battery cell.

[5] In a secondary battery cell and the like according to a fifth embodiment of the present invention, when a resistance value measurement means detects a change in resistance value, the storage area stores information indicating that the integrated circuit has been removed from the secondary battery cell.

[6] In a secondary battery cell and the like according to a sixth embodiment of the present invention, when a monitor circuit detects a change in clock frequency, the storage area stores information indicating that the integrated circuit has been removed from the secondary battery cell.

[7] In a secondary battery cell and the like according to a seventh embodiment of the present invention, when a detection means detects that the integrated circuit has been removed from the secondary battery cell, the storage area stores information indicating that the integrated circuit has been removed from the secondary battery cell.

Here, the storage area can be formed of, for example, a RAM, a resistor, or an EEPROM. Further, it is preferable for the storage area to be formed of a plurality of bits and formed of a flag area in which whether the integrated circuit has been removed from the secondary battery cell or not is stored and an error detection bit area for the flag area. It is preferable to provide a mode in which when the integrated circuit is removed from the secondary battery cell, data stored in the storage area (specifically, in the flag area and the error detection bit area) is deleted or rewritten. Thus, for example, a control circuit to be described later investigates information (data) stored in the storage area, which makes it possible to reliably determine that the integrated circuit is removed from the secondary battery cell.

Alternatively, a fuse (or circuit disconnection means) is further included, and the following configurations can be adopted.

[1] In the secondary battery cell and the like according to the first embodiment of the present invention, when the wiring abnormality detection circuit detects a wiring abnormality, the integrated circuit disconnects a fuse (circuit disconnection means).

[2] In the secondary battery cell and the like according to the second embodiment of the present invention, when the photodetection means detects light, the integrated circuit disconnects a fuse (circuit disconnection means).

[3] In the secondary battery cell and the like according to the third embodiment of the present invention, when the pressure detection means detects a change in pressure, the integrated circuit disconnects a fuse (circuit disconnection means).

[4] In the secondary battery cell and the like according to the fourth embodiment of the present invention, when the voltage measurement means detects a change in voltage, the integrated circuit disconnects a fuse (circuit disconnection means).

[5] In the secondary battery cell and the like according to the fifth embodiment of the present invention, when the resistance value measurement means detects a change in resistance value, the integrated circuit disconnects a fuse (circuit disconnection means).

[6] In the secondary battery cell and the like according to the sixth embodiment of the present invention, when the monitor circuit detects a change in clock frequency, the integrated circuit disconnects a fuse (circuit disconnection means).

[7] In the secondary battery cell and the like according to the seventh embodiment of the present invention, when the detection means detects that the integrated circuit has been removed from the secondary battery cell, the integrated circuit disconnects a fuse (circuit disconnection means). It should be noted that the disconnection of the circuit disconnection means includes not only a mode of physically disconnecting the circuit disconnection means but also a mode of electrically disconnecting the circuit disconnection means.

In the secondary battery cell and the like according to the first embodiment to the seventh embodiment of the present invention including the preferred modes and configurations described above (hereinafter, collectively referred to simply as "a secondary battery cell and the like of the present invention" in some cases), the integrated circuit is arranged on the outer surface of the secondary battery cell or on the inside thereof. In other words, in the secondary battery cell and the like of the present invention including various preferred modes and configurations, the following eight modes in total are provided.

[1] A mode in which the integrated circuit is arranged on the outer surface of the secondary battery cell, a power source is an external power source, and information is transmitted in a wireless system.

[2] A mode in which the integrated circuit is arranged on the outer surface of the secondary battery cell, a power source is an external power source, and information is transmitted in a wired system.

[3] A mode in which the integrated circuit is arranged on the outer surface of the secondary battery cell, a power source is a secondary battery cell, and information is transmitted in a wireless system.

[4] A mode in which the integrated circuit is arranged on the outer surface of the secondary battery cell, a power source is a secondary battery cell, and information is transmitted in a wired system.

[5] A mode in which the integrated circuit is arranged inside the secondary battery cell, a power source is an external power source, and information is transmitted in a wireless system.

[6] A mode in which the integrated circuit is arranged inside the secondary battery cell, a power source is an external power source, and information is transmitted in a wired system.

[7] A mode in which the integrated circuit is arranged inside the secondary battery cell, a power source is a secondary battery cell, and information is transmitted in a wireless system.

[8] A mode in which the integrated circuit is arranged inside the secondary battery cell, a power source is a secondary battery cell, and information is transmitted in a wired system. Here, the "information" refers to identification information and further includes, depending on circumstances, individual information and a battery state that will be described later. Further, the wired system includes a power line communication system.

In the case where the integrated circuit is arranged on the outer surface of the secondary battery cell, the integrated circuit only needs to be bonded onto the outer surface of the secondary battery cell. Alternatively, the integrated circuit only needs to be laminated on the outer surface of the secondary battery cell by an appropriate means. Further, a part of an exterior film can be used as an antenna, wiring, or the like to connect the integrated circuit. It is preferable that the abnormality detection wiring or the shielding wiring be also laminated.

On the other hand, in the case where the integrated circuit is arranged inside a cylinder-type secondary battery cell, the integrated circuit only needs to be arranged in a gap existing between an upper insulating plate and a safety valve mechanism that are provided inside the secondary battery cell or in an appropriate space such as a gap existing immediately below a battery lid or a cap. Further, in the case where the integrated circuit is arranged inside a square-type secondary battery cell including a laminate type, the integrated circuit only needs to be arranged in, for example, an appropriate space such as a gap surrounded by an insulating spacer arranged immediately below a sealing plate (cap plate) or a laminate portion.

Further, in the secondary battery cell and the like of the present invention, the integrated circuit can be formed to store individual information. Here, as the individual information, at least one kind of information selected from the group consisting of an identification number (ID number) given to the secondary battery cell, an authentication number given to the secondary battery cell, a manufacturer name of the secondary battery cell, a vendor name of the secondary battery cell, a model number of the secondary battery cell, the rating of the secondary battery cell, specifications of the secondary battery cell, and key information for authentication of the secondary battery cell can be exemplified. If the identification number or the authentication number given to the secondary battery cell is set as the individual information, whether the secondary battery cell is an authenticated regular secondary battery cell or not can be determined easily and reliably.

In the case where the power source of the integrated circuit is the secondary battery cell, that is, in order to drive the integrated circuit by power from the secondary battery cell, the integrated circuit only needs to be connected to a positive electrode or a positive electrode extending portion (for example, a positive electrode lead, a positive electrode pin, or a battery lid) and a negative electrode or a negative electrode extending portion (for example, negative electrode lead or battery can) by using an appropriate means, or connected to a heat sensitive resistance element (positive temperature coefficient, PCT element) and a negative electrode or a negative electrode extending portion. As will be described later, also in the case where a battery current and/or a battery terminal voltage are/is measured by the integrated circuit, a similar connection mode only needs to be adopted. On the other hand, in the case where the power source of the integrated circuit is the external power source, the integrated circuit only needs to be formed to operate by power based on an electrical signal from the outside of the secondary battery cell. In other words, the integrated circuit can be configured to receive an electrical signal from the outside of the secondary battery cell in a wired or wireless manner and rectify the electrical signal to obtain power.

In the secondary battery cell and the like of the present invention, as described above, the integrated circuit can be configured to transmit the identification information or the identification information and individual information (hereinafter, collectively referred to as "identification information and the like" in some cases) to the outside of the secondary battery cell by radio waves. Thus, the configuration of the battery pack can be simplified. In the case of the wireless communication, its system can include infrared rays including ZigBee and IrDA, Bluetooth as one of wireless LAN protocols, HomeRF, Wi-Fi, NFC, RFID, Felica, ISO/IEC 18092, and ISO/IEC 14443, and the like. Alternatively, the integrated circuit can be configured to transmit the identification information and the like to the outside of the secondary battery cell by wires. It should be noted that in the case where the integrated circuit is arranged inside the secondary battery cell, it is preferable that the integrated circuit be configured to be connected to an information input terminal and an information output terminal provided to the secondary battery cell or to an information input/output terminal, which can simplify sensing wiring in the whole battery pack and reduce the number of connection points with the control circuit, thus achieving the improvement of the reliability of the battery pack.

In the case where the transmission or the like of the identification information and the like is performed in a wireless system, the integrated circuit can be configured to include an antenna. Depending on circumstances, an electrode or a battery lid of the secondary battery cell can be used as an antenna, or an exterior material of the secondary battery cell may be patterned to form an antenna. For example, the antenna can be a coiled antenna or a dipole antenna. In the case where the identification information and the like are transmitted in a wired system, the control circuit and the secondary battery cell only need to be connected to each other by wiring (sensing wiring).

In a battery pack according to the present invention including the preferred modes and configurations described above or a battery pack in a power consumption device, a control circuit is further provided. The control circuit can be configured to determine whether or not an integrated circuit is one that has been removed from a secondary battery cell (authenticates the integrated circuit) based on the identification information from the integrated circuit provided to each secondary battery cell and configured to authenticate each secondary battery cell based on the individual information from the integrated circuit. Then, in this case, it is preferable that the control circuit be configured to store the same information as the identification information of each secondary battery cell or the same information as the identification information and individual information. Further, in those preferred configurations, the control circuit can be formed to receive the identification information and the like from the integrated circuit provided to each secondary battery cell or depending on circumstances, a battery state to be described later, via radio waves. With this, the configuration of the battery pack can be simplified. Alternatively, in those preferred configurations, the control circuit can be formed to receive the identification information and the like from the integrated circuit provided to each secondary battery cell or depending on circumstances, a battery state to be described later, based on capacitive coupling (AC coupling). With this, it is unnecessary to require a high withstand voltage of the control circuit. It should be noted that in this mode, the integrated circuit transmits the identification information and the like to the control circuit by wires. However, in the case where the integrated circuit is arranged inside the secondary battery cell, it is preferable that the integrated circuit be configured to be connected to the information input terminal and the information output terminal provided to the secondary battery cell or to the information input/output terminal. With this, sensing wiring can be simplified in the whole battery pack and the number of connection points with the control circuit can be reduced, thus achieving the improvement of the reliability of the battery pack. Further, it is also possible to provide a mode of receiving a battery state by superimposing the battery state on a power line.

The control circuit can be formed of a circuit including an MPU and a storage means (for example, formed of EEPROM), and includes a communication circuit for receiving the identification information and the like from the integrated circuit or a battery state to be described later and exchanging information with the integrated circuit as needed. As described above, it is preferable to store the same identification information and the like and information (data) as the identification information and the like and the information (data) that are stored in the memory unit provided to the secondary battery cell, in the storage means of the control circuit. Depending on circumstances, a sequencer can be used as a substitute for the MPU. By transmission of a control signal or an electrical signal from the control circuit to the secondary battery cell, the integrated circuit can be controlled. The control circuit corresponds to the "outside".

The identification information and the like or various types of information stored in the integrated circuit and/or a communication path may be encrypted. With this, a third party has a difficulty of breaking the encryption.

The integrated circuit may have a measurement function of measuring a battery state (battery information). With this, the secondary battery cell itself can collect information on a battery state and the configuration of the whole battery pack can be simplified. Here, the battery state measured by the integrated circuit can be in a mode of at least one physical amount selected from the group consisting of a battery temperature, a battery current, and a battery terminal voltage. Although depending on a place where the integrated circuit is arranged on the secondary battery cell, the battery temperature means a temperature inside the secondary battery cell or a temperature of the outer surface of the secondary battery cell. Further, the battery current means a value of a current flowing between the positive electrode and the negative electrode of the secondary battery cell. In addition, the battery terminal voltage means a voltage value between the positive electrode and the negative electrode of the secondary battery cell. The battery state only needs to be transmitted to the outside or the control circuit together with the identification information and the like. In order to measure the battery temperature, the integrated circuit only needs to have a pn junction portion, for example. A built-in potential (built-in voltage) in a pn junction portion has temperature dependence. Therefore, a forward current is caused to flow in the pn junction portion to measure a voltage value or a constant forward voltage is applied to the pn junction portion to measure a current value, so that the temperature of the secondary battery cell can be obtained. For the measurement of a battery current, a well-known current measurement circuit only needs to be provided in the integrated circuit, and also for the measurement of a battery terminal voltage, a well-known voltage measurement circuit only needs to be provided in the integrated circuit.

In the battery pack of the present invention including the preferred modes and configurations described above or a battery pack in a power consumption device of the present invention, as a connection mode of a plurality of secondary battery cells (state of assembled battery), a mode of connecting a plurality of secondary battery cells in parallel and connecting in series a plurality of parallel connection units thus obtained and a mode of connecting a plurality of secondary battery cells in series and connecting in parallel a plurality of in-line connection units thus obtained can be exemplified, though not limited thereto.

Examples of the secondary battery cell include a lithium-ion secondary battery, but the secondary battery cell is not limited thereto. A type of secondary battery to be used only needs to be selected as appropriate in accordance with required properties. The configuration and structure of the secondary battery cell itself can be the well-known configuration and structure, and the shape of the secondary battery cell can also be the well-known cylinder type or square type including a laminate type as described above. A charge/discharge control circuit for controlling charge and discharge of the secondary battery cell can be formed of the well-known circuit including an MPU and a storage means (for example, formed of EEPROM). The charge/discharge control circuit may include a well-known battery protection circuit. In order to stop the function of the battery pack as needed, the battery protection circuit only needs to be operated. It should be noted that the charge/discharge control circuit may be incorporated into the above-mentioned control circuit.

For example, the battery pack in the present invention can be applied to various power consumption devices such as electric cars (including hybrid cars), golf carts, electric carts, electric motorcycles, electric power-assisted bicycles, rail cars, electric tools including electric drills, power supply units or home energy servers (household electric storage apparatuses), personal computers, mobile phones, PDAs (personal digital assistants), digital still cameras, video cameras, camcorders, electronic books, electronic dictionaries, music players, radios, headphones, cordless handsets, electric shavers, refrigerators, air conditioners, television receivers, image display apparatuses, monitors, stereo apparatuses, water heaters, microwaves, dishwashers, washing machines, dryers, lighting devices including interior lights, game machines, navigation systems, memory cards, pacemakers, hearing aids, medical devices, toys, robots, load conditioners, and traffic lights and can be used as drive power sources or auxiliary power sources of those power consumption devices. Alternatively, for example, the battery pack in the present invention can be applied to devices such as power sources for power storage for buildings including houses or power-generating facilities, can be used to supply power to those devices, and can also be used as an electric storage device in a so-called smart grid. It should be noted that such electric storage devices can not only supply power but also store power by receiving power supplied from another power source. Further, the battery pack in the present invention can be incorporated into a home energy management system (HEMS) or a building energy management system (BEMS). As a power source for charging a secondary battery cell constituting the battery pack, not only commercial power sources but also various solar batteries, fuel cells, thermal power generation facilities, nuclear power generation facilities, hydropower generation facilities, wind power generation apparatuses, low-head hydropower generation apparatuses, geothermal power generation apparatuses, and the like can be exemplified, and regenerative energy generated by a power consumption device can also be exemplified, but the power source is not limited thereto.

Example 1

Example 1 relates to a secondary battery cell according to the first embodiment and the seventh embodiment of the present invention, a battery pack of the present invention in which the secondary battery cell according to the first embodiment and the seventh embodiment of the present invention is incorporated, and a power consumption device of the present invention in which the secondary battery cell according to the first embodiment and the seventh embodiment of the present invention is incorporated. In Example 1, the integrated circuit is arranged on the outer surface of the secondary battery cell, a power source of the integrated circuit is the secondary battery cell, and information is transmitted in a wired system.

Figure 1:
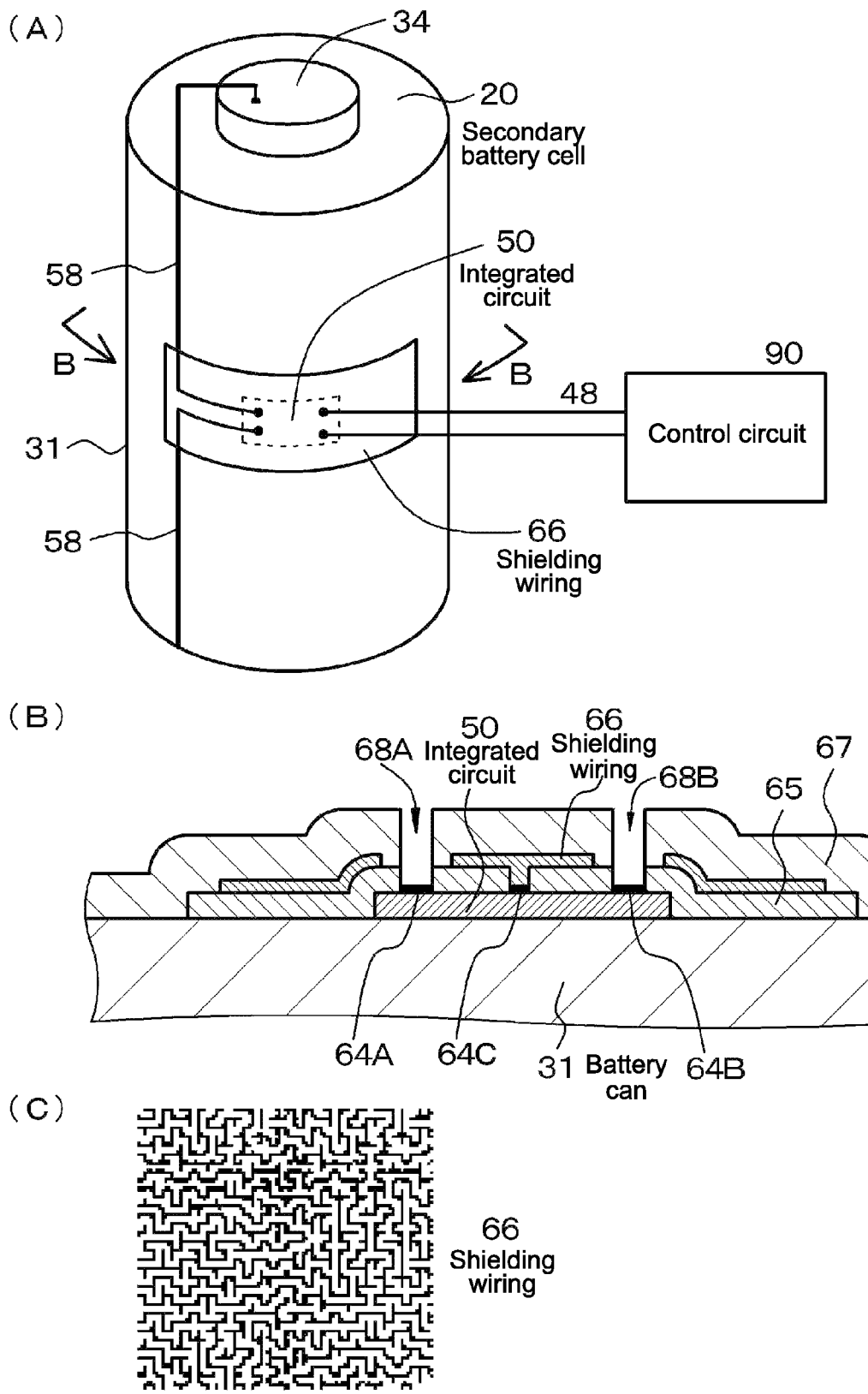
Figure 2:
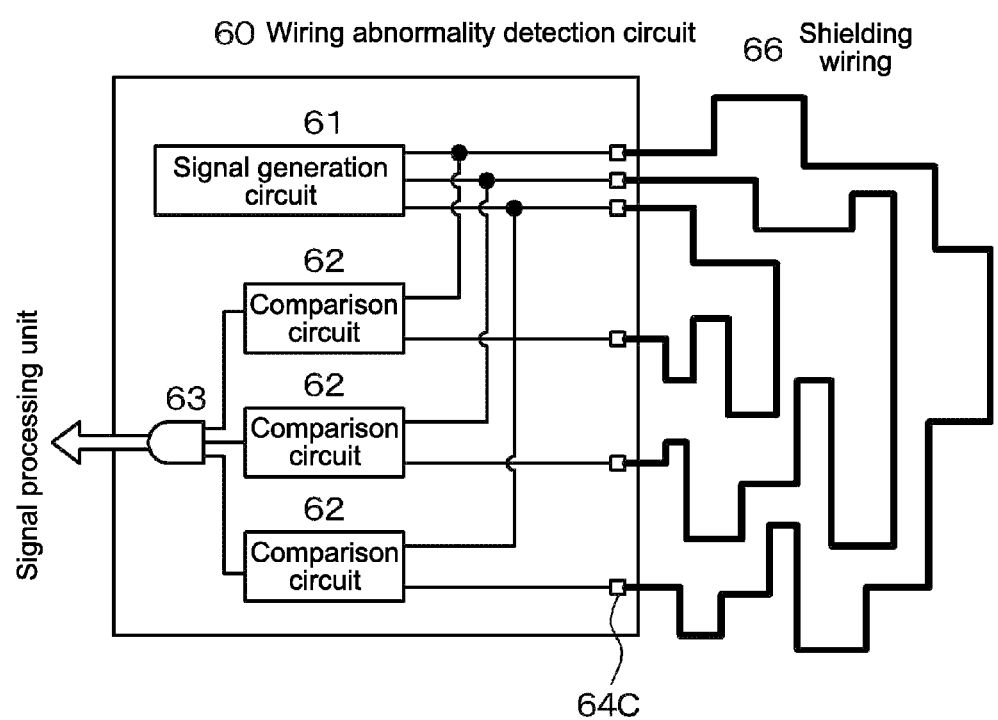
Figure 4:
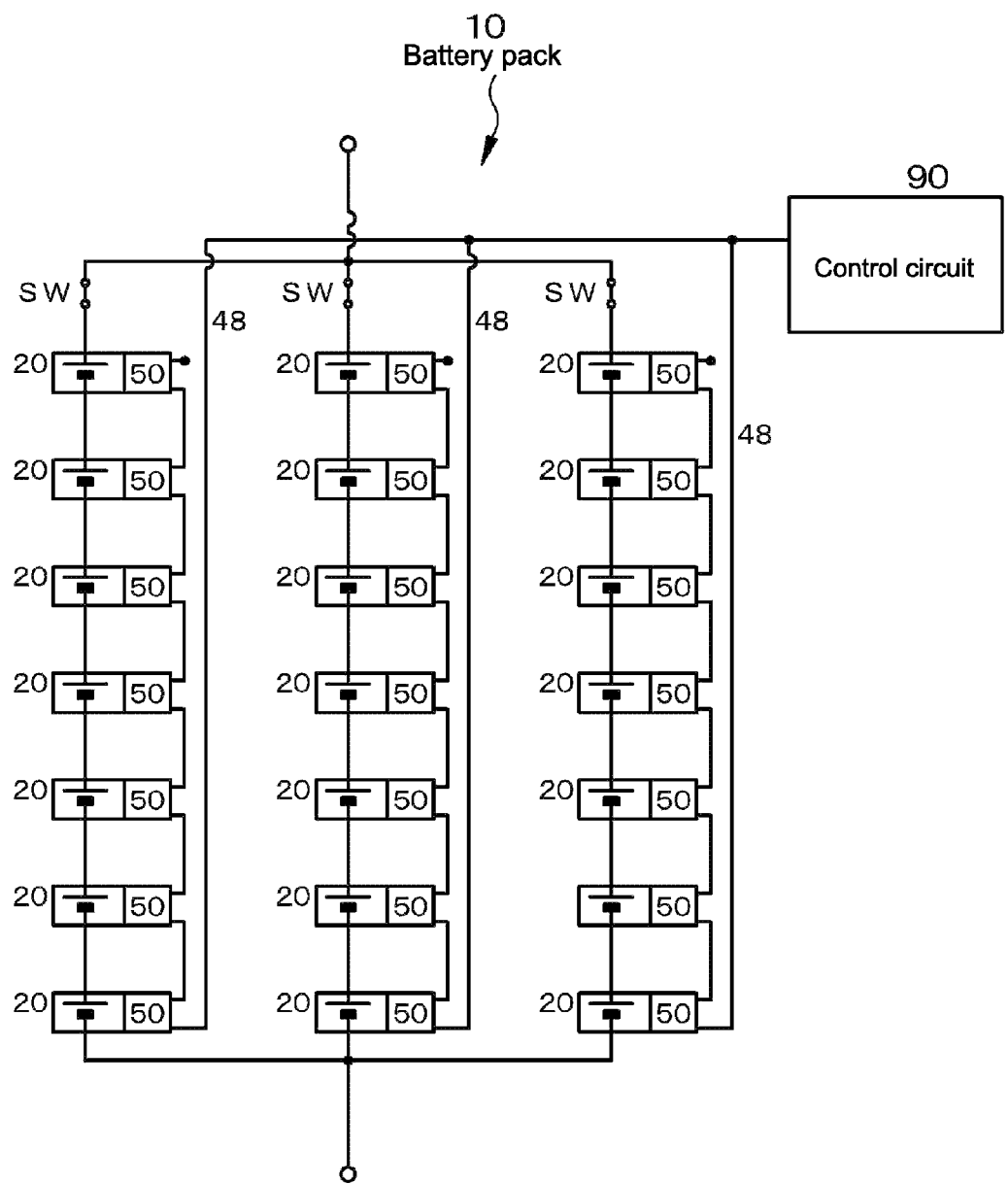
Figure 5:
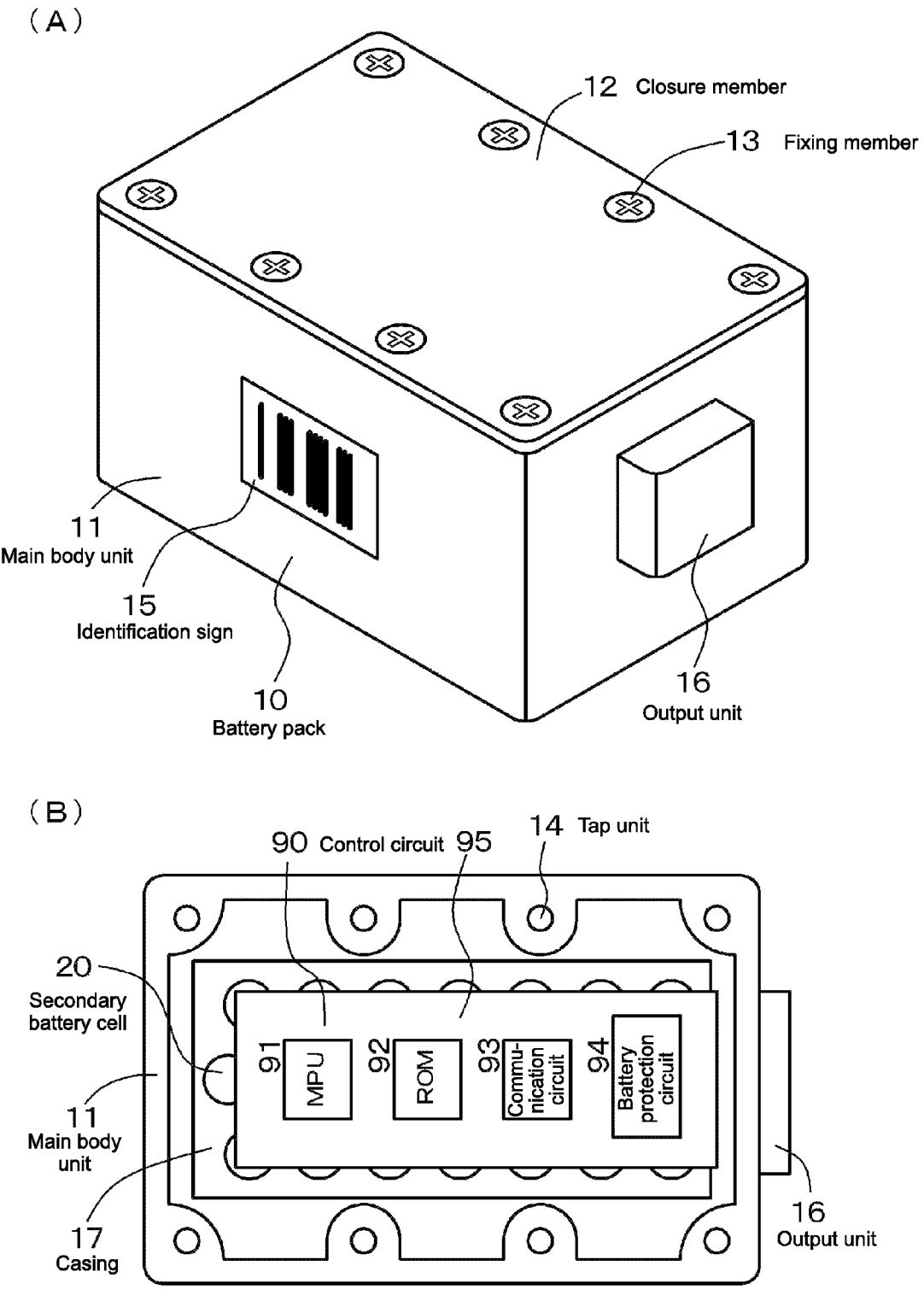
Figure 6:
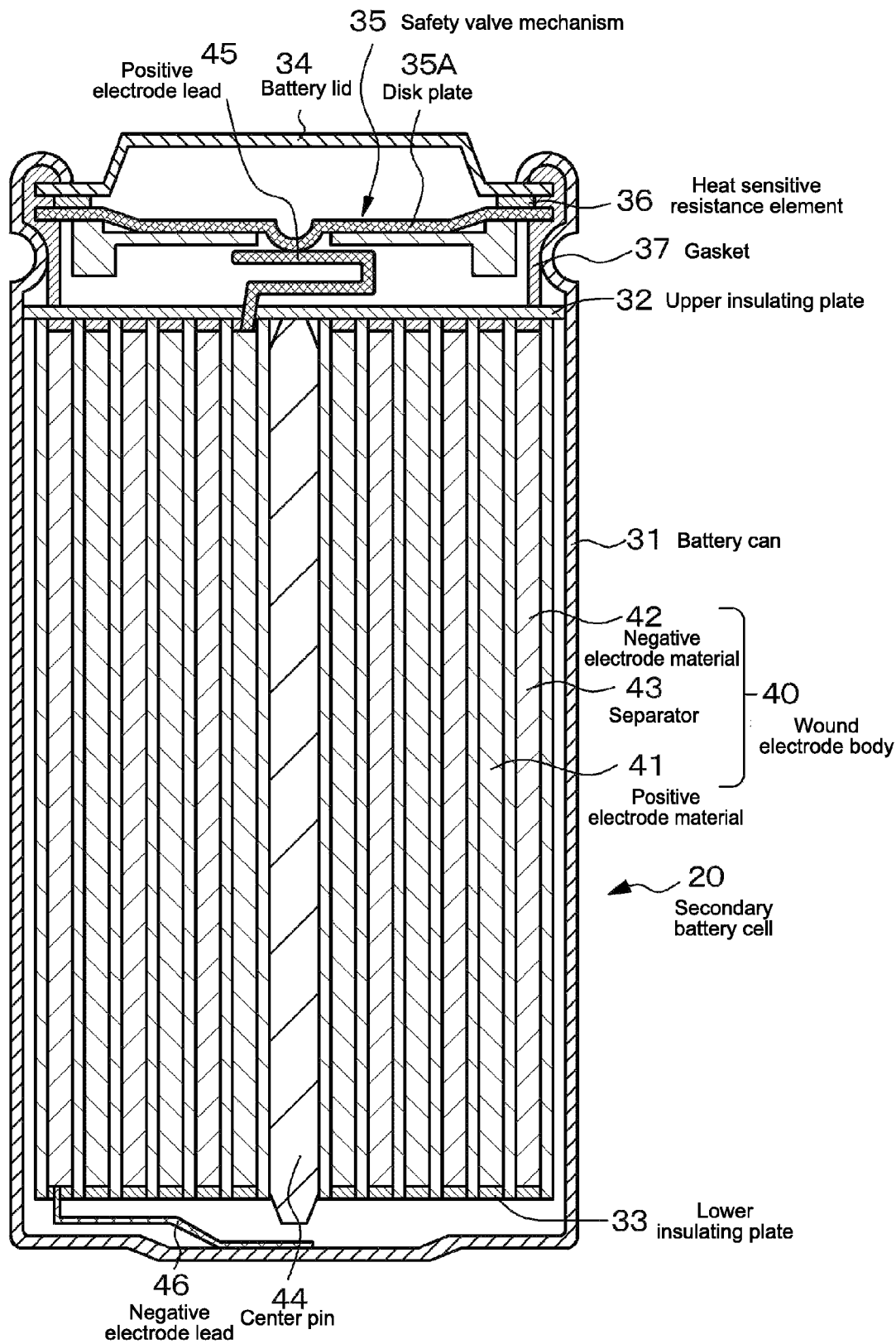

A schematic perspective view of the secondary battery cell of Example 1 is shown in (A) of FIG. 1, a schematic partial end view of the integrated circuit and the like taken along the arrow B-B of (A) of FIG. 1 is shown in (B) of FIG. 1, and a schematic partial plan view of abnormality detection wiring or shielding wiring is shown in (C) of FIG. 1. Further, a block diagram of a wiring abnormality detection circuit in Example 1 is shown in FIG. 2, a block diagram of the integrated circuit in Example 1 is shown in (A) of FIG. 3, and a connection state of secondary battery cells in a battery pack of Example 1 is shown in FIG. 4. Further, a schematic perspective view of the battery pack and a schematic view of a state in which a lid of the battery pack is removed are shown in (A) and (B) of FIG. 5, respectively, and a schematic end view of the secondary battery cell of Example 1 is shown in FIG. 6. It should be noted that in (B) of FIG. 1, the cross sections of a battery can and the like are shown to be flat, but actually, the cross sections of the battery can and the like are formed into an arc.

A secondary battery cell 20 of Example 1 or Example 2 to Example 12 to be described later includes an integrated circuit (IC chip) 50 that stores identification information. Here, specifically, the identification information is identification number (ID number) given to the integrated circuit 50 itself. Further, in Example 1, the integrated circuit 50 is driven by power from the secondary battery cell 20.

Figure 3:
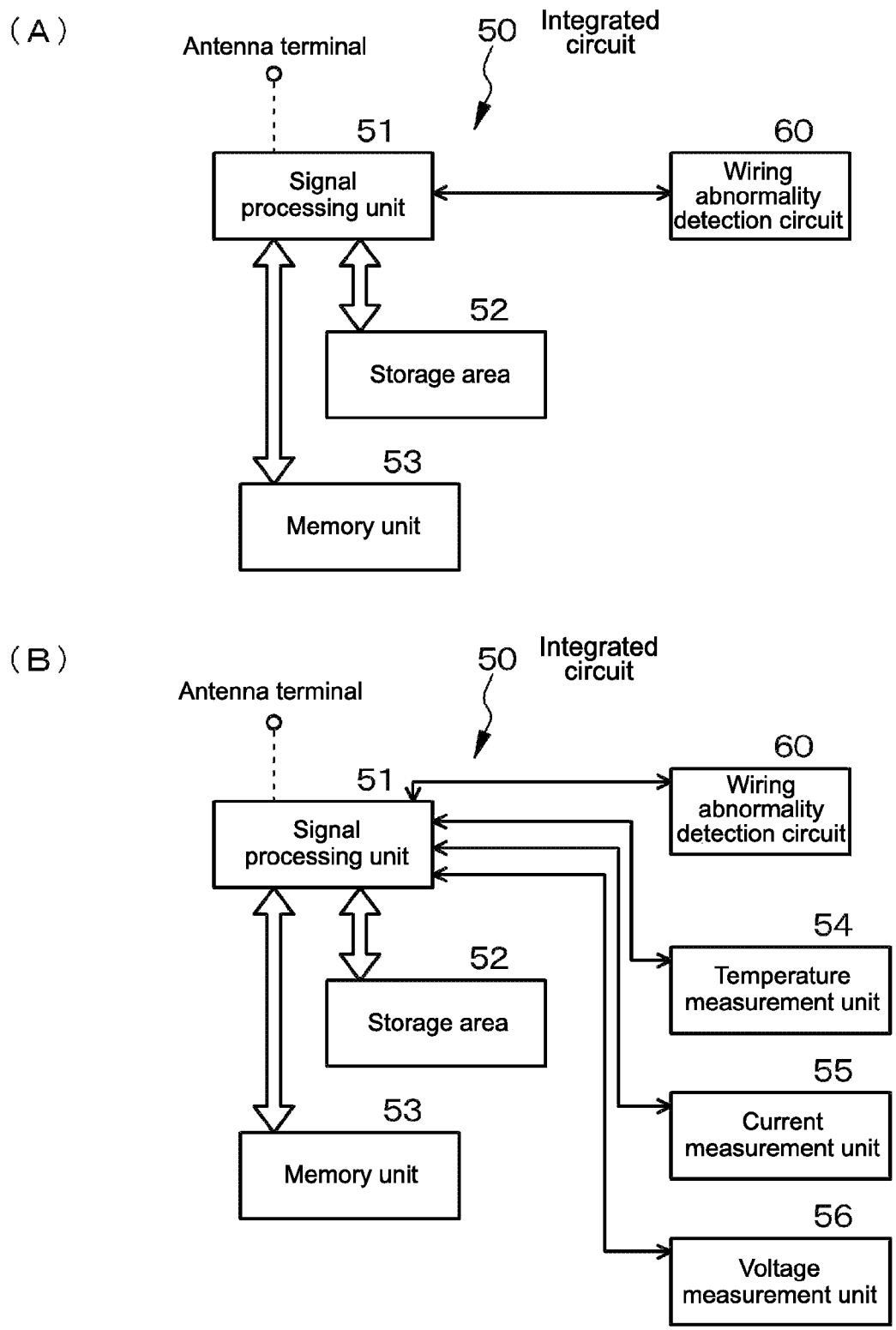

As shown in (A) of FIG. 3 that is a block diagram of the integrated circuit 50 of Example 1, in Example 1 to Example 12, the integrated circuit 50 includes a signal processing unit 51 that processes an input/output signal, a storage area 52 formed of a RAM, and a memory unit 53 that is necessary to store identification information and the like and perform various processing. The storage area 52 stores whether the integrated circuit 50 has been removed from the secondary battery cell 20 or not. Specifically, the storage area 52 formed of a RAM is formed of a plurality of bits and formed of a flag area in which whether the integrated circuit 50 has been removed from the secondary battery cell 20 or not is stored and an error detection bit area for the flag area.

Further, in the memory unit 53 of the integrated circuit 50, the identification information and the like (identification information and individual information) are stored. Here, for example, the individual information is an identification number (ID number) and an authentication number given to the secondary battery cell 20. It should be noted that any one kind of a manufacturer name of the secondary battery cell 20, a vendor name, a model number of the secondary battery cell, the rating, specifications, and key information for authentication of the secondary battery cell, or a combination of arbitral multiple kinds may be further added as the individual information.

Further, in Example 1 to Example 7, the integrated circuit 50 includes a wiring abnormality detection circuit 60. Then, in Example 1 to Example 7, when the integrated circuit 50 is removed from the secondary battery cell 20, the wiring abnormality detection circuit 60 detects a wiring abnormality. Alternatively, the integrated circuit 50 includes a detection means for detecting that the integrated circuit 50 has been removed from the secondary battery cell 20 (specifically, wiring abnormality detection circuit 60 in Example 1 to Example 7).

A battery pack 10 of Example 1 or Example 2 to Example 12 to be described later includes the plurality of secondary battery cells 20. In other words, the battery pack 10 of Example 1 or Example 2 to Example 12 to be described later includes the plurality of secondary battery cells 20 each including the integrated circuit (IC chip) 50 that stores identification information and the like, and the integrated circuit 50 is driven by power from the secondary battery cell 20 or an external power source. Although FIG. 4 shows a connection state (state of assembled battery) of the secondary battery cells 20 in Example 1, in the battery pack 10 in Example 1 or Example 2 to Example 12 to be described later, the plurality of secondary battery cells 20 are connected in series and a plurality of in-line connection units thus obtained are connected in parallel, though not limited thereto. More specifically, in the battery pack 10, seven secondary battery cells 20 are connected in series, and three in-line connection units each formed of the secondary battery group thus connected in series are connected in parallel. The secondary battery cells 20 are housed in a casing 17 formed of a plastic material such as an ABS resin. It should be noted that in Example 1, the integrated circuits 50 are connected in a so-called cascading connection system.

Then, the battery pack 10 in Example 1 or Example 2 to Example 12 to be described later further includes a control circuit (control apparatus) 90. The control circuit 90 determines whether the integrated circuit is one that has been removed from the secondary battery cell or not (authentication of integrated circuit), based on the identification information from the integrated circuit 50 provided to each secondary battery cell 20 and also based on the individual information as needed, and authenticates each secondary battery cell 20. The control circuit 90 is formed of a circuit including an MPU 91 and a storage means 92 formed of an EEPROM, for example. Further, the control circuit 90 includes a communication circuit 93 for receiving the identification information from the integrated circuit 50 and exchanging information with the integrated circuit 50 and transmits a control signal to the secondary battery cell 20 at predetermined time intervals. Further, a charge/discharge control circuit that controls charge and discharge of the secondary battery cell 20 is incorporated into the control circuit 90. In the storage means 92 of the control circuit 90, the identification information is stored, and the control circuit 90 performs collation with the identification information from the integrated circuit 50. Further, the individual information is also stored in the storage means 92 of the control circuit 90, and the control circuit 90 performs collation with the individual information from the integrated circuit 50. The power source of the control circuit 90 is the secondary battery cell 20 constituting the battery pack 10. The control circuit 90 includes a well-known battery protection circuit 94. In order to stop the function of the battery pack 10 as needed, the battery protection circuit 94 only needs to be operated. Specifically, the battery protection circuit 94 is formed of a fuse and in order to stop the function of the battery pack 10, the battery protection circuit 94 is operated. In other words, the fuse only needs to be blown under the control of the MPU 91. Alternatively, the function of an over-discharge prevention switch or an overcharge prevention switch included in the battery protection circuit 94 may be stopped. However, the battery protection circuit 94 is not limited to such a configuration.

In Example 1, the secondary battery cell 20 is a cylinder-type secondary battery cell and is formed of a lithium-ion secondary battery. The configuration and structure of the secondary battery cell 20 itself can be the well-known configuration and structure.

As shown in FIG. 6 that is a schematic end view, in the secondary battery cell 20 formed of the lithium-ion secondary battery of Example 1, a wound electrode body 40 obtained by winding a positive electrode material 41 and a negative electrode material 42 via a separator 43, and a pair of insulating plates (upper insulating plate 32 and lower insulating plate 33) are housed inside a substantially hollow, cylindrical battery can 31. The separator 43 insulates the positive electrode material 41 and the negative electrode material 42 from each other and causes lithium ions to pass therethrough while preventing a short circuit due to contact between the positive electrode material 41 and the negative electrode material 42. The battery can 31 is made of nickel-plated iron, for example, and one end portion thereof is closed and the other end portion is opened to form an opening end portion. The pair of insulating plates 32 and 33 interposes the wound electrode body 40 therebetween and is arranged so as to be located perpendicularly to a wound circumferential surface of the wound electrode body 40.

A battery lid 34, and a safety valve mechanism 35 and a heat sensitive resistance element (PTC element) 36 that are provided inside the battery lid 34, are attached to the opening end portion of the battery can 31 by being caulked via a gasket 37, and the inside of the battery can 31 is hermetically sealed. The battery lid 34 is made of the same material as the battery can 31, for example. The safety valve mechanism 35 is electrically connected to the battery lid 34 via the heat sensitive resistance element 36. The safety valve mechanism 35 has a configuration in which, in the case where an internal pressure reaches a certain level or more due to an internal short circuit, an application of heat from the outside, or the like, a disk plate 35A is inverted so that an electrical connection between the battery lid 34 and the wound electrode body 40 is disconnected. The heat sensitive resistance element 36 increases resistance in accordance with a temperature rise and thus limits a current and prevents abnormal heat due to a large current from being generated. A gasket 37 is formed of an insulating material, for example, and asphalt is applied to its surface.

For example, a center pin 44 is inserted into the center of the wound electrode body 40. In the wound electrode body 40, a positive electrode lead 45 formed of aluminum or the like is connected to the positive electrode material 41, and a negative electrode lead 46 formed of nickel or the like is connected to the negative electrode material 42. The positive electrode lead 45 is welded to the safety valve mechanism 35, thus being electrically connected to the battery lid 34. On the other hand, the negative electrode lead 46 is welded to the battery can 31.

The lithium-ion secondary battery is manufactured in the following manner, for example.

First, the positive electrode material 41 and the negative electrode material 42 are produced by a well-known method. Next, the positive electrode lead 45 is attached to the positive electrode material 41 by welding, and the negative electrode lead 46 is attached to the negative electrode material 42 by welding. After that, the positive electrode material 41 and the negative electrode material 42 are wound via the separator 43 to form the wound electrode body 40. A leading end portion of the positive electrode lead 45 is welded to the safety valve mechanism 35, and a leading end portion of the negative electrode lead 46 is welded to the battery can 31, and thereafter the wound electrode body 40 is housed inside the battery can 31 while being interposed between the pair of insulating plates 32 and 33. Then, an electrolytic solution is injected into the inside of the battery can 31 so that the separator 43 is impregnated with electrolytic solution. Finally, the battery lid 34, the safety valve mechanism 35, and the heat sensitive resistance element 36 are fixed to the opening end portion of the battery can 31 by caulking via the gasket 37. In this way, the lithium-ion secondary battery shown in FIG. 6 can be completed.

In Example 1, the integrated circuit 50 is arranged on the outer surface of the secondary battery cell 20, a power source of the integrated circuit 50 is the secondary battery cell 20, and information is transmitted in a wired system. In other words, the identification information and the like are transmitted to the outside of the secondary battery cell 20 (specifically, control circuit 90) by wires (specifically, via wiring 48). The integrated circuit 50 is connected to a positive electrode (specifically, battery lid 34) and a negative electrode (specifically, battery can 31) of the secondary battery cell 20 via wiring 58.

Then, in the battery pack 10 of Example 1, each of the 21 secondary battery cells 20 is stored in a storage unit provided to the casing 17. When all the secondary battery cells 20 are stored in the storage unit, the casing 17 is housed inside the main body unit 11 of the battery pack 10, and thereon, a printed wiring board 95 attached with an MPU 91 and the like is attached to the main body unit 11 by an appropriate method (see (B) of FIG. 5). The main body unit 11 is covered with a closure member (specifically, lid) 12, and a fixing unit provided to the main body unit 11 (for example, bushing provided with tap unit 14) is screwed with a fixing member (for example, screw) 13. It should be noted that a reference numeral 15 represents an identification sign (serial ID, bar code) stuck to a side wall of the main body unit 11, and a reference numeral 16 represents an output unit. Essentially, the main body unit 11 has an arbitrary shape, but in Example 1, the shape is a cuboid. An opening portion of the main body unit 11 through which the plurality of secondary battery cells 20 are taken in and out is provided to a top surface of the main body unit 11, and the closure member 12 closes the opening portion. It should be noted that the opening portion may be provided to a side surface of the main body unit 11 or to a bottom surface of the main body unit 11.

In Example 1, as shown in (B) of FIG. 1 that is a schematic partial end view, the integrated circuit 50 is bonded to the outer surface of the secondary battery cell 20 by using an adhesive (not shown). Then, the wiring abnormality detection circuit 60 is connected to the abnormality detection wiring or the shielding wiring 66 provided to the secondary battery cell 20. The shielding wiring 66 is continuously formed over the outer surface of the secondary battery cell 20 from above the integrated circuit 50. Specifically, the shielding wiring 66 is formed of an active shield and a guard voltage is applied thereto. More specifically, a film 65 is continuously laminated over the outer surface of the secondary battery cell 20 from above the integrated circuit 50, and the shielding wiring 66 connected to the integrated circuit 50 at a terminal portion (pad portion) 64C is formed on the film 65 by a screen printing method. After that, the whole is laminated with an exterior film 67. Opening portions 68A and 68B are provided to the exterior film 67, and terminal portions (pad portions) 64A and 64B are exposed at bottom portions of the opening portions 68A and 68B. Then, the wiring 58 (not shown in (B) of FIG. 1) is attached to the terminal portion 64A, and the wiring 48 (not shown in (B) of FIG. 1) is attached to the terminal portion 64B.

As shown in FIG. 2 that is a block diagram of the wiring abnormality detection circuit 60, the wiring abnormality detection circuit 60 includes a signal generation circuit 61, comparison circuits 62, and an AND circuit 63. It should be noted that FIG. 2 shows three lines of the shielding wiring 66, but the number of lines of the shielding wiring 66 is not limited thereto. A predetermined voltage is applied to the shielding wiring 66 from the signal generation circuit 61.

After the battery pack 10 is completely assembled, various types of information (data) are initialized. In other words, the identification information and the like of all the secondary battery cells 20 are caused to correspond to the positions of the secondary battery cells 20 in the casing 17, and the control circuit 90 stores the correspondence in the storage means 92. Alternatively, the control circuit 90 stores the identification information and the like of all the secondary battery cells 20 in the storage means 92 based on a polling system. In the memory unit 53 of each integrated circuit 50, identification information is stored in advance. Then, under the control of the control circuit 90, individual information is stored in the memory unit 53 of each integrated circuit 50. Further, under the control of the control circuit 90, "information indicating that the integrated circuit has not been removed from the secondary battery cell" (hereinafter, referred to as "non-removal information") is stored in the flag area of the storage area 52 of the integrated circuit 50, and appropriate data is written in the error detection bit area for the flag area. The non-removal information is stored also in the storage means 92 of the control circuit 90.

When the integrated circuit 50 is intended to be removed from the secondary battery cell 20, the exterior film 67 has to be removed and then the shielding wiring 66 and the film 65 have to be removed. In such an operation, the shielding wiring 66 inevitably causes a disconnection or short circuit, and the shielding wiring 66 enters a non-conductive state or a short circuit state. As a result, a change is caused in a voltage that is input to the comparison circuits 62 of the wiring abnormality detection circuit 60 via the shielding wiring 66, and a change is caused in an output of the AND circuit 63. Thus, the wiring abnormality detection circuit 60 can detect a wiring abnormality. Then, the signal processing unit 51 of the integrated circuit 50 detects a change of the output of the AND circuit 63 and stores in the storage area 52 information indicating that the wiring abnormality has been detected (in other words, information indicating that the integrated circuit 50 has been removed from the secondary battery cell 20). Alternatively, when the detection means detects that the integrated circuit 50 has been removed from the secondary battery cell 20, the storage area 52 stores information indicating that the integrated circuit 50 has been removed from the secondary battery cell 20. In other words, data (non-removal information) stored in the storage area 52 (specifically, flag area and error detection bit area) is deleted or rewritten.

At predetermined time intervals, based on the position information of the secondary battery cell 20 of the casing 17, the control circuit 90 transmits a command for inquiring about whether the integrated circuit 50 has been removed from the secondary battery cell 20 or not and a command for inquiring about the identification information and the like, to the integrated circuit 50 provided to the secondary battery cell 20, specifically, via the communication circuit 93 and the wiring 48. The signal processing unit 51 of the integrated circuit 50 that receives this command transmits the identification information and the like stored in the memory unit 53 and the information stored in the flag area of the storage area 52 to the control circuit 90. The control circuit 90 that receives the identification information and the like and the information stored in the flag area investigates whether the information stored in the flag area corresponds to non-removal information or not. Then, in the case where the information stored in the flag area does not correspond to the non-removal information, in other words, the integrated circuit is not authenticated, it is determined that the integrated circuit 50 is one that has been removed from the secondary battery cell 20, and a warning or the like is given to a user who uses the battery pack 10. Depending on circumstances, the output from the battery pack 10 is stopped. Further, in the case where the information stored in the flag area corresponds to the non-removal information, the control circuit 90 investigates whether or not the received identification information and the like matches the identification information and the like stored in the storage means 92. It should be noted that the match or mismatch of the identification information and the like may be investigated before the information stored in the flag area is investigated. Such an operation and processing are sequentially performed on all the secondary battery cells 20. Then, in the case where the identification information mismatches, or the identification information matches but the individual information mismatches, in other words, in the case where authentication is not established, the control circuit 90 determines that the secondary battery cell 20 in the battery pack 10 is fraudulently substituted, and a warning or the like is given to a user who uses the battery pack 10. Depending on circumstances, the output from the battery pack 10 is stopped.

When the integrated circuit 50 is removed from the secondary battery cell 20, the data (non-removal information) stored in the storage area 52 (specifically, flag area and error detection bit area) is deleted or rewritten. Therefore, for example, the control circuit 90 investigates the information (data) stored in the storage area 52, and thus it can be determined reliably that the integrated circuit 50 has been removed from the secondary battery cell 20, as described above.

In addition, the control circuit 90 and the integrated circuit 50 provided to each secondary battery cell 20 store not only the identification information but also the individual information such as an identification number and an authentication number that are given to the secondary battery cell 20. Thus, it is possible to easily identify each of the secondary battery cells 20 and easily and reliably determine whether the secondary battery cell is an authenticated regular secondary battery cell or not.

Generally, when a discharge voltage of the secondary battery cell 20 has a certain value or less, the output of the power from the battery pack is stopped. However, even in such a situation, the secondary battery cell 20 has sufficient power for driving the control circuit 90 or the integrated circuit 50, and therefore no problems are caused. However, if the battery pack is left as it is for a long period of time, the secondary battery cell 20 may lose enough power to drive the control circuit 90 or the integrated circuit 50. In such a case, charging of the battery pack and initialization of various information (data) in the battery pack only need to be performed by a manufacturer of the battery pack, or the like.

In Example 1 or Example 2 to Example 12 to be described later, the battery pack 10 can be applied to power consumption devices, for example, electric cars (including hybrid cars), golf carts, electric carts, electric motorcycles, electric power-assisted bicycles, and rail cars. In other words, the power consumption device includes the battery pack 10 that includes a plurality of secondary battery cells 20 each including the integrated circuit 50 having a measurement function of measuring a battery state. Then, the battery pack 10 can be discharged in order to drive a conversion apparatus (specifically, motor, for example) that is provided to those described above and converts power into a driving force by being supplied with power, and can be charged using a regenerative energy from the apparatus. It should be noted that those power consumption devices include, for example, a control apparatus including an indication of a battery remaining amount, and a control apparatus that performs information processing related to the control of the power consumption device based on information on the secondary battery cell 20.

Since the wiring abnormality detection circuit that detects a wiring abnormality is provided in Example 1, it is possible to reliably detect that an integrated circuit provided to a secondary battery cell has been removed from that secondary battery cell and reliably prevent the integrated circuit from being used for another secondary battery cell or being attached to another secondary battery cell. Additionally, since the integrated circuit stores the identification information, in order to determine whether a battery pack mounted to a power consumption device can be used safely for the power consumption device, it is possible to easily and reliably authenticate a secondary battery cell provided to the battery pack. Further, since a so-called cascading connection system is adopted as a connection system for the integrated circuit 50 in Example 1 and the integrated circuits are sequentially authenticated, the identification information and the like of all the secondary battery cells in the battery pack can be known by using a small amount of wiring, and complicated wiring is unnecessary. For that reason, the wiring can be simplified in the whole battery pack, and the number of connection points with the control circuit can be reduced, thus achieving the improvement of the reliability of the battery pack.

Depending on circumstances, instead of providing the storage area 52 or together with the storage area 52, a fuse (or circuit disconnection means) may be arranged on a power input side of the integrated circuit 50 or on the inside of the integrated circuit 50, such as the signal processing unit 51. Then, when the wiring abnormality detection circuit 60 detects a wiring abnormality, the integrated circuit 50 blows (or disconnects) a fuse (or circuit disconnection means).

With this, the integrated circuit 50 is disabled, and it is possible to reliably detect that the integrated circuit 50 provided to a secondary battery cell 20 has been removed from the secondary battery cell and to prevent the integrated circuit 50 from being attached to another secondary battery cell.

Figure 7:
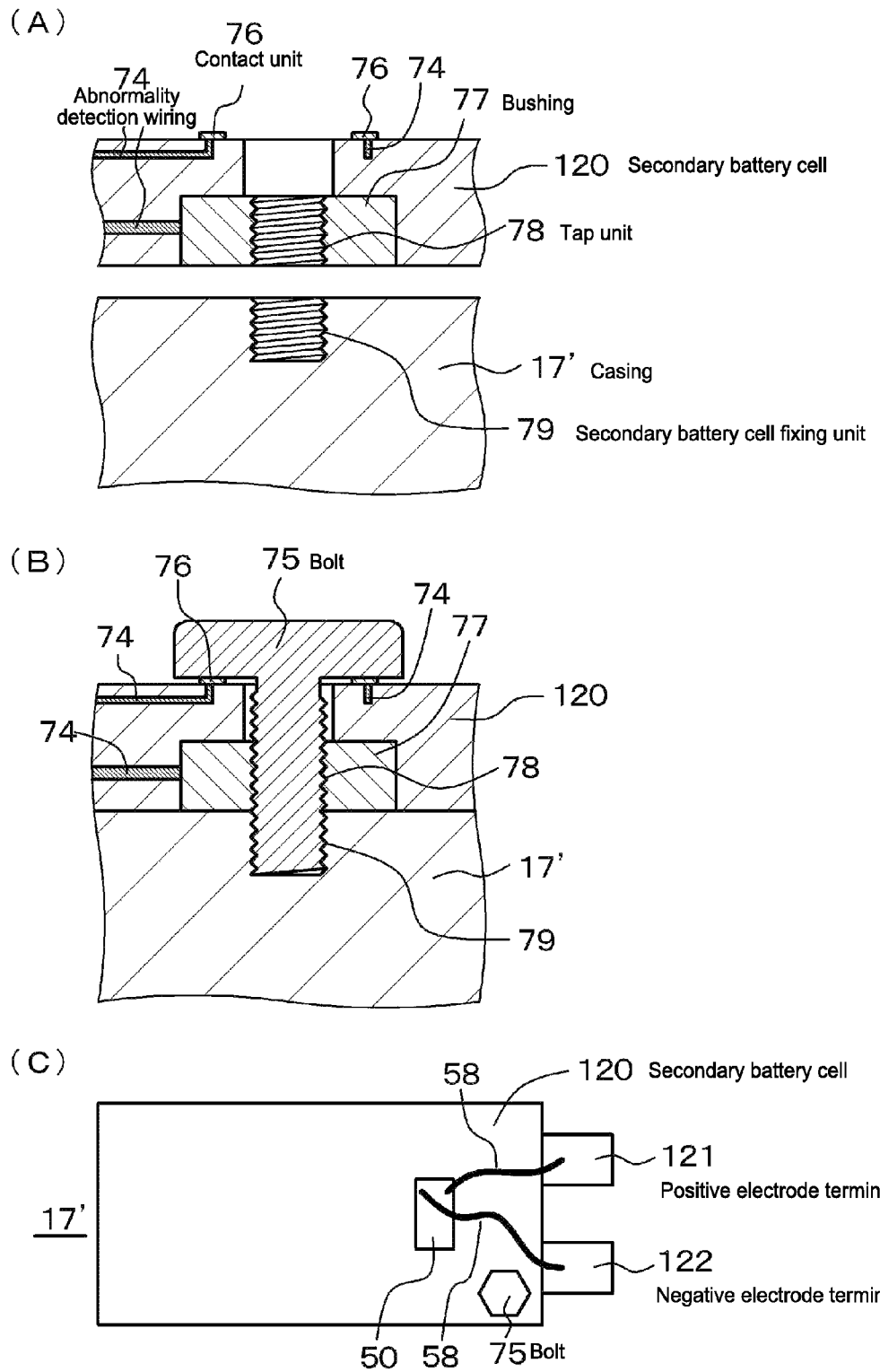

Further, as shown in (A) and (B) of FIG. 7 that are schematic partial cross-sectional views of a square-type secondary battery cell and the like, and as shown in (C) of FIG. 7 that is a schematic partial plan view, it is also possible to provide a configuration in which a secondary battery cell 120 is attached to a secondary battery cell fixing unit 79 of a casing 17' with use of a bolt 75, and an abnormality detection wiring 74 is connected to the bolt 75 and a contact unit 76. In the secondary battery cell 120, for example, a bushing 77 provided with a tap unit 78 is attached. By connection of the abnormality detection wiring 74 to the bushing 77, the abnormality detection wiring 74 can be connected to the bolt 75. The abnormality detection wiring 74 is also connected to the wiring abnormality detection circuit 60. Then, in a state where the bolt 75 is attached to the secondary battery cell fixing unit 79 (see (B) of FIG. 7), the bolt 75 and the contact unit 76 are in a contact state, and the abnormality detection wiring 74 is in a conductive state. On the other hand, when the bolt 75 is removed from the secondary battery cell fixing unit 79, the bolt 75 and the contact unit 76 enter a non-contact state, with the result that the abnormality detection wiring 74 enters a non-conductive state. For that reason, it is possible to reliably detect that the integrated circuit 50 provided to the secondary battery cell 120 has been removed from the secondary battery cell 120 and to reliably prevent the integrated circuit 50 from being attached to another secondary battery cell.

Example 2

Example 2 is a modification of Example 1. In a secondary battery cell 20 of Example 2, an integrated circuit (IC chip) 50 has a measurement function of measuring a battery state (battery information). Then, the integrated circuit 50 transmits a measured battery state to the outside of the secondary battery cell 20 (specifically, control circuit 90) by wires. In other words, the integrated circuit 50 is connected to a control circuit 90 provided to a battery pack 10 via wiring 48, and a battery state of the integrated circuit 50 is transmitted to the control circuit 90 via the wiring 48.

In Example 2, a battery state measured by the integrated circuit 50 is at least one physical amount selected from the group consisting of a battery temperature, a battery current, and a battery terminal voltage. More specifically, the battery state measured by the integrated circuit 50 refers to three physical amounts of a battery temperature, a battery current, and a battery terminal voltage. It should be noted that the physical amounts are not limited thereto and can be only a battery temperature, only a battery current, only a battery terminal voltage, a battery temperature and battery current, a battery temperature and battery terminal voltage, or a battery current and battery terminal voltage. Then, in order to measure a battery temperature, the integrated circuit 50 includes a pn junction portion. Further, in order to measure a battery current, the integrated circuit 50 includes a well-known current measurement circuit (specifically, for example, a current measurement circuit formed of a combination of a shunt resistance, an operational amplifier, and an analog-to-digital converter, a combination of a current transformer type or hall element type current sensor, a magnetic resonance type current sensor, an operational amplifier, and an analog-to-digital converter, or a combination of a reference voltage generation circuit, a resistor, and an analog-to-digital converter), and in order to measure a battery terminal voltage, the integrated circuit 50 includes a well-known voltage measurement circuit (specifically, for example, a voltage measurement circuit constituted of a combination of an operational amplifier and an analog-to-digital converter, a combination of a reference voltage generation circuit and a comparison circuit, or a combination of an operational amplifier and an analog-to-digital converter).

As shown in (B) of FIG. 3 that is a block diagram of the integrated circuit 50 of Example 2, the integrated circuit 50 includes a temperature measurement unit (temperature measurement circuit) 54 that measures a battery temperature, a current measurement unit (current measurement circuit) 55 that measures a battery current, and a voltage measurement unit (voltage measurement circuit) 56 that measures a battery terminal voltage, in addition to the signal processing unit 51 that processes an input/output signal, the storage area 52, and the memory unit 53 that is necessary to store individual information and perform various processing. It should be noted that all the temperature measurement unit 54, the current measurement unit 55, and the voltage measurement unit 56 are not necessarily mounted to the integrated circuit 50 and may be mounted by selecting their functions depending on the intended use. The current measurement unit 55 and the voltage measurement unit 56 of the integrated circuit 50 are connected to the battery lid 34 and the battery can 31 via the wiring 58 in order to measure a current and a voltage.

Based on an instruction issued from the control circuit 90 at predetermined second time intervals, the integrated circuit 50 measures a battery state of the secondary battery cell 20 and transmits a measured battery state, and the control circuit 90 receives the measured battery state so that the battery state can be known. Then, based on the received battery state, the control circuit 90 determines whether the secondary battery cell 20 has an abnormality. Such an operation and processing are sequentially performed on all the secondary battery cells 20. Then, if an abnormality occurs in the secondary battery cell 20, in other words, an abnormal temperature rise of the secondary battery cell 20, an abnormal current flow in the secondary battery cell 20, and an abnormal voltage value change in the secondary battery cell 20 occur, switches SW provided to the in-line connection units are each set to an off state under the control of the control circuit 90, and then an in-line connection unit including a secondary battery cell 20 in which an abnormality occurs only needs to be separated from the battery pack 10. Depending on circumstances, the output from the battery pack 10 may be stopped. Then, a warning or the like indicating that an abnormality has occurred in the secondary battery cell only needs to be given to a user who uses the battery pack 10. It should be noted that also in the case where an abnormality occurs in the integrated circuit 50 and the integrated circuit 50 enters a state in which information cannot be exchanged, it is preferable to take the same action.

In this way, in the secondary battery cell, the battery pack 10, or the power consumption device of Example 2, the integrated circuit 50 of the secondary battery cell 20 has a measurement function of measuring a battery state. Therefore, the secondary battery cell 20 itself can collect information of the battery state, which can simplify the configuration of the whole battery pack. It should be noted that the integrated circuit and the battery pack of Example 2 can be applied as appropriate to each of Examples to be described below.

Example 3

Figure 8:
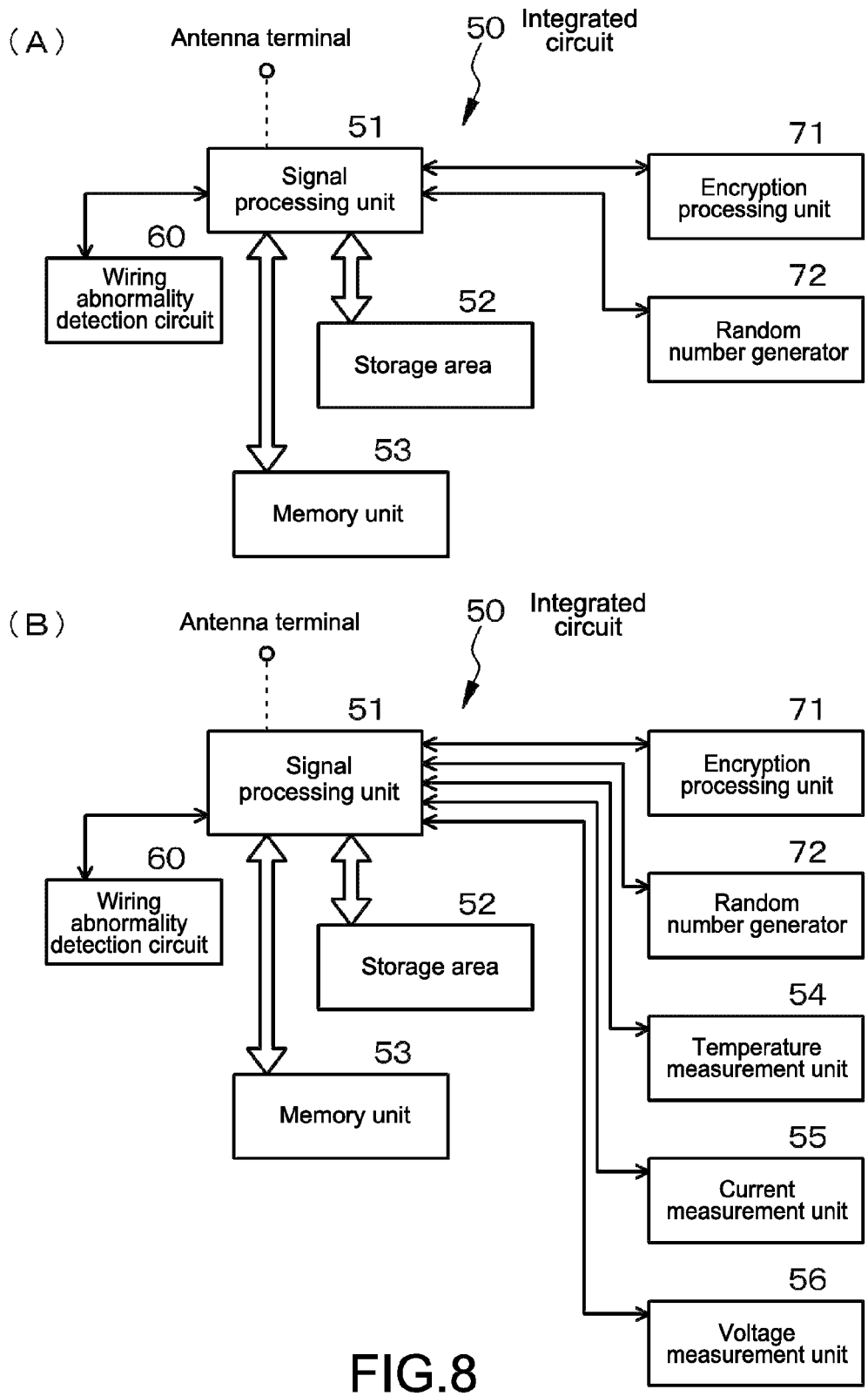

Example 3 is also a modification of Example 1. In Example 3, various types of information or identification information and the like stored in an integrated circuit 50 are encrypted. Specifically, as shown in (A) of FIG. 8 that is a block diagram of the integrated circuit 50, the integrated circuit 50 further includes an encryption processing unit 71 and a random number generator 72. The encryption processing unit 71 and the random number generator 72 can be well-known encryption processing unit and random number generator and therefore detailed descriptions thereof will be omitted. A secondary battery cell, a battery pack, and a power consumption device can also be the same secondary battery cell, the battery pack, and the power consumption device that have been described in Example 1 or Example 2, and therefore detailed descriptions thereof will be omitted. Since the various types of information or the identification information and the like stored in the integrated circuit 50 are encrypted in Example 3, a third party has a difficulty of breaking the encryption. It should be noted that a communication path may be encrypted in the same manner. As described above, the integrated circuit in Example 3 can be combined with the integrated circuit described in Example 2, as shown in the block diagram of (B) of FIG. 8. Further, the integrated circuit and the battery pack of Example 3 can be applied as appropriate to each of Examples to be described below.

Example 4

Figure 9:
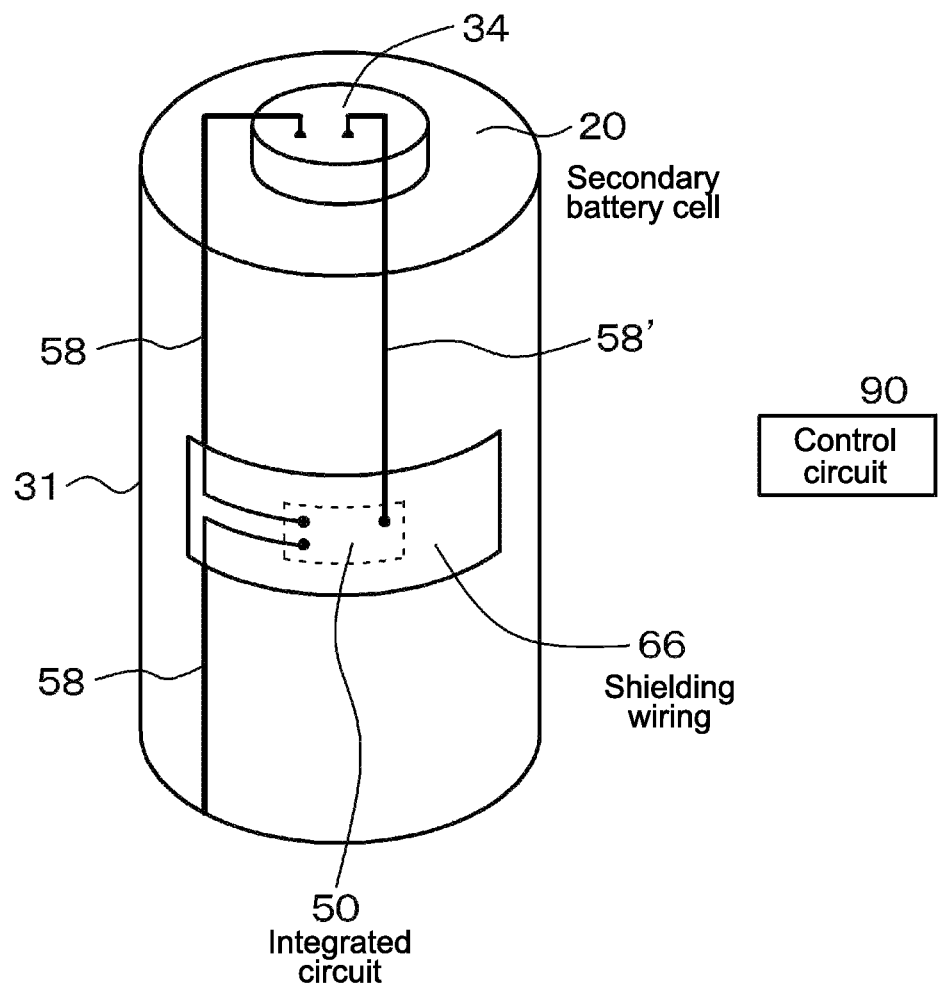
Figure 10:
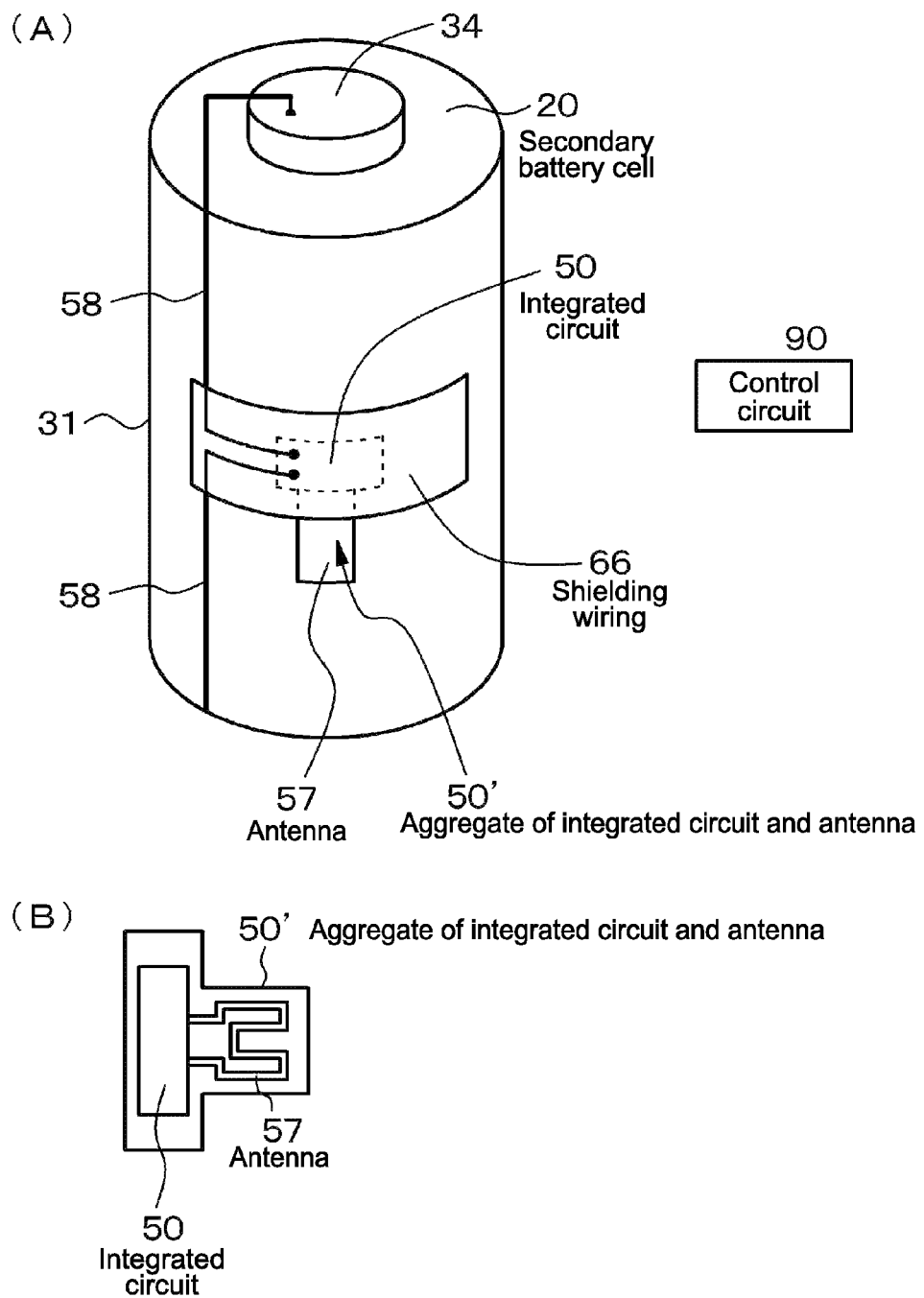
Figure 11:
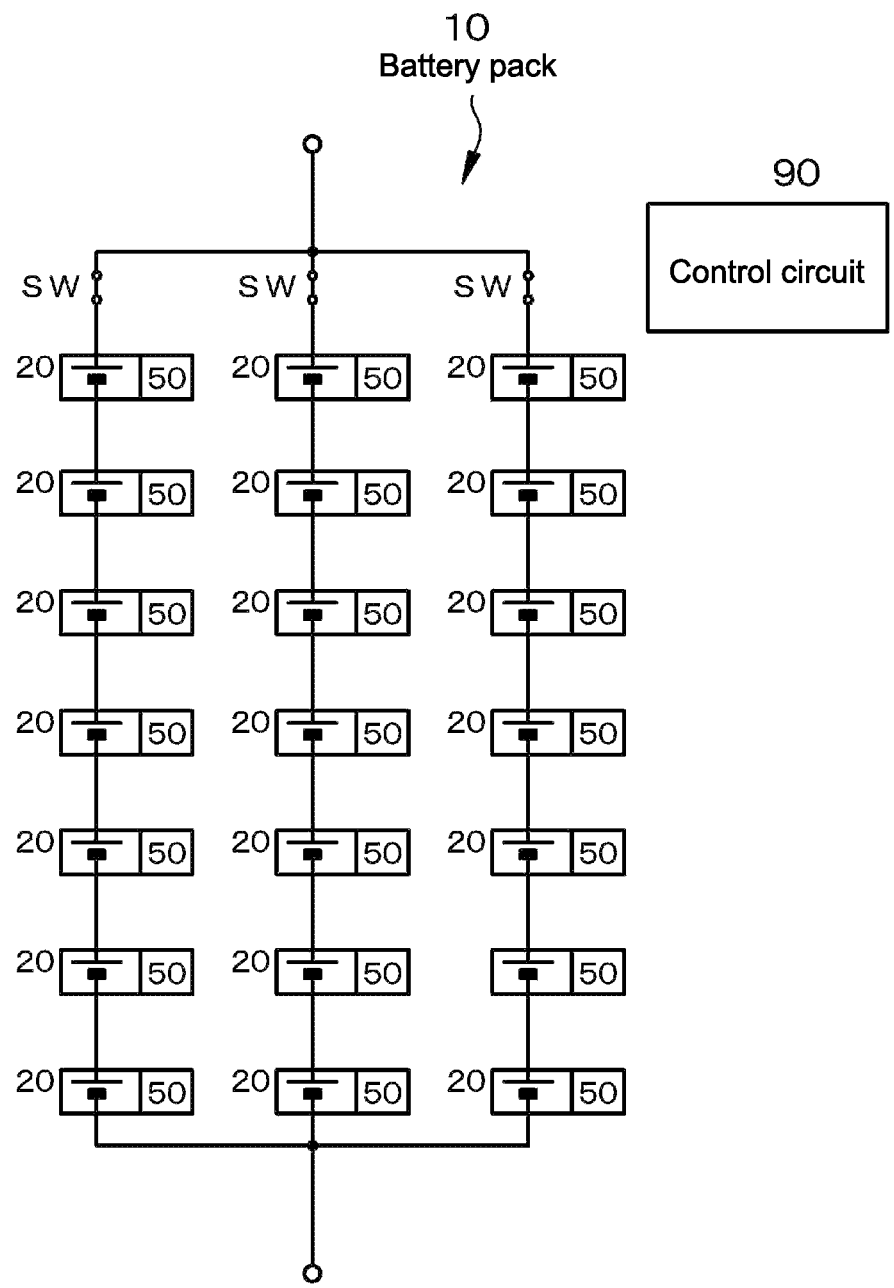
FIG. 11 is a diagram showing a connection state of secondary battery cells in a battery pack of Example 4.

Example 4 is also a modification of Example 1. In Example 4, information is transmitted in a wireless system. In other words, as shown in FIG. 11 showing a connection state of secondary battery cells in a battery pack of Example 4, in a secondary battery cell 20 of Example 4, an integrated circuit 50 transmits non-removal information and identification information and the like to the outside of the secondary battery cell 20 (specifically, control circuit 90 provided to battery pack 10) by radio waves. As shown in FIG. 9 that is a schematic perspective view, the integrated circuit 50 is connected to a battery lid 34 of the secondary battery cell 20 by wiring 58' and uses the battery lid 34 as an antenna. Depending on circumstances, as shown in (A) of FIG. 10 that is a schematic perspective view and in (B) of FIG. 10 that is a schematic view of an aggregate including the integrated circuit and the antenna, the integrated circuit 50 may be provided with an independent antenna 57. It should be noted that in (A) and (B) of FIG. 10, the aggregate of the integrated circuit 50 and the antenna 57 is indicated as an integrated circuit aggregate (wireless IC tag) 50'.

In Example 4, the non-removal information and the identification information and the like of all the secondary battery cells in the battery pack can be known via radio waves, and complicated wiring is unnecessary. Further, at predetermined time intervals, based on position information of the secondary battery cell 20 in a casing 17, a command for inquiring about the non-removal information and the identification information is transmitted from the control circuit 90 via radio waves. Except for the above points, operations and processing for authentication and the like can be the same as those of Example 1, and therefore detailed descriptions thereof will be omitted. In Example 4, the configuration of the whole battery pack 10 can be simplified. The integrated circuit and the battery pack of Example 4 can be applied as appropriate to each of Examples to be described below.

The antenna may be caused to function as abnormality detection wiring. Specifically, the antenna is formed in the same configuration (note that a forming pattern is different) and the same forming method as those for the shielding wiring 66 described in Example 1, and the antenna is connected to the wiring abnormality detection circuit as well. Also with such a configuration, when the integrated circuit is intended to be removed from the secondary battery cell, the antenna inevitably causes a disconnection, with the result that information indicating that a wiring abnormality has been detected (in other words, information indicating that the integrated circuit 50 has been removed from the secondary battery cell 20) can be reliably detected.

Example 5

Example 5 is also a modification of Example 1. In Example 1 described above, the integrated circuit 50 arranged on the outer surface of each secondary battery cell 20 is connected to the control circuit 90 via two lines of wiring (sensing wiring) 48.

Incidentally, as an embodiment of a connection state of secondary battery cells 20 in a conventional battery pack 10 (state of assembled battery) is shown in FIG. 26 and a schematic end view of the secondary battery cell is shown in FIG. 27, the integrated circuit 50 arranged on the outer surface of each secondary battery cell 20 is connected to the control circuit 90 via an information input/output terminal 47 and the wiring (sensing wiring) 48. In other words, the integrated circuit 50 is connected in a so-called bus connection system. In such a state, for example, a secondary battery cell 20A and a secondary battery cell 20B of FIG. 26 largely differs from each other in a voltage value of a direct-current component in a signal that is output from the integrated circuit 50 to the control circuit 90 via the wiring (sensing wiring) 48. Therefore, when the integrated circuit 50 transmits identification information and the like to the outside of the secondary battery cell 20 (specifically, control circuit 90) by wires, a range of the voltage value to be input to the control circuit 90 is increased and for example, there arises a problem that a withstand voltage of various circuits constituting the control circuit 90 has to be increased.

Figure 12:
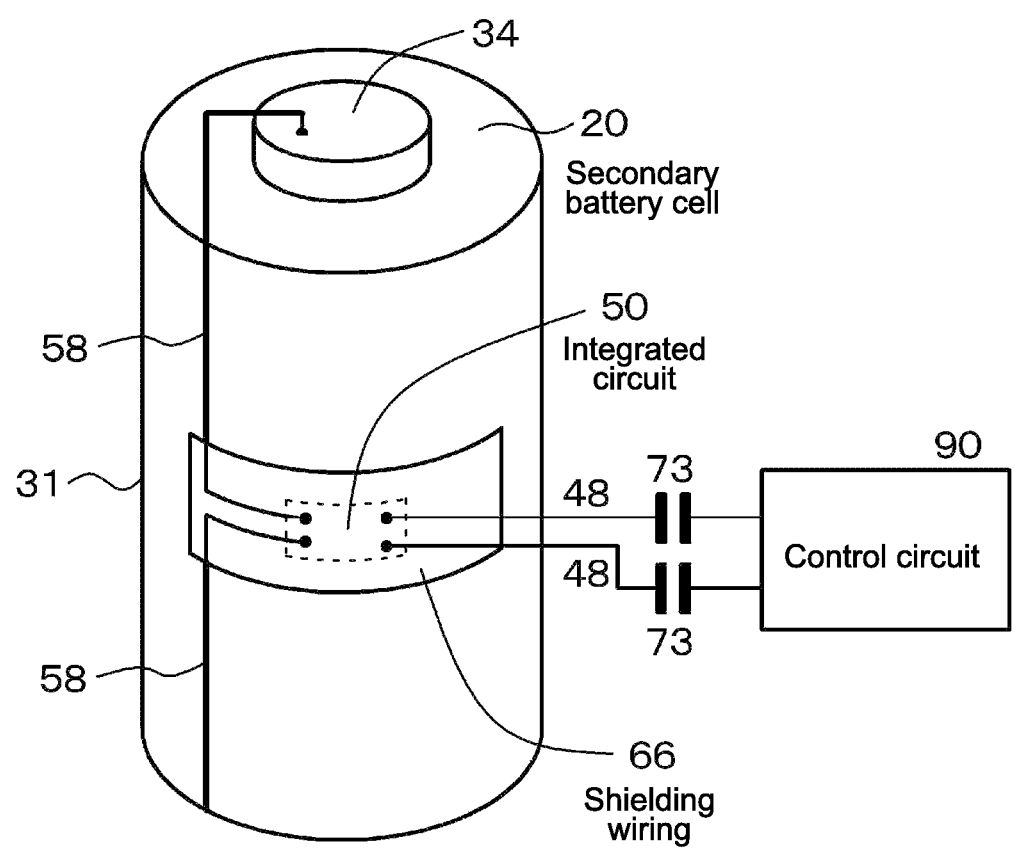
FIG. 12 is a schematic perspective view of a secondary battery cell of Example 5.
Figure 13:
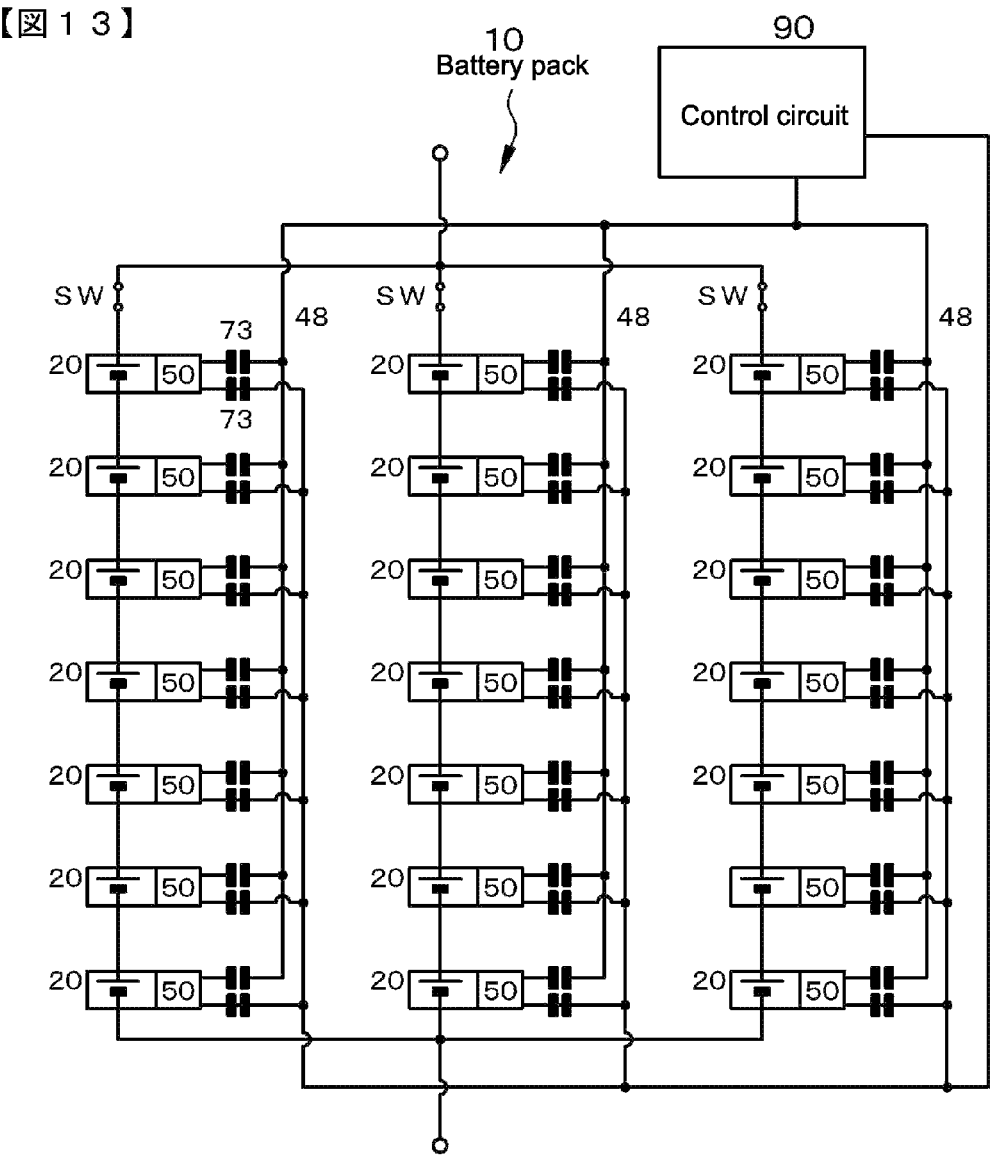
FIG. 13 is a diagram showing a connection state of secondary battery cells in a battery pack of Example 5.

To avoid generation of such a problem, in Example 5, as shown in FIG. 13 showing a connection state of secondary battery cells 20 in a battery pack 10 (state of assembled battery) and in FIG. 12 that is a schematic perspective view of the secondary battery cell 20, an integrated circuit 50 is connected in a so-called bus connection system, while a control circuit 90 receives identification information and the like from the integrated circuit 50 provided to each secondary battery cell 20, based on capacitive couplings 73. By such capacitive couplings 73, a direct-current component of a signal that is output from the integrated circuit 50 to the control circuit 90 via wiring (sensing wiring) 48 is eliminated, and therefore it is unnecessary to require a high withstand voltage of the control circuit 90. The integrated circuit and the battery pack of Example 5 can be applied as appropriate to each of Examples to be described below.

The capacitive couplings 73 may be formed in a communication circuit 93 of the control circuit 90, may be independently formed in the control circuit 90, may be formed in a signal processing unit 51 of the integrated circuit 50, may be independently formed in the integrated circuit 50, or may be arranged (formed) between the integrated circuit 50 and the control circuit 90. Specifically, for example, a capacitor (capacity unit) formed of two conductor layers (for example, wiring, electrode, and the like provided inside a circuit) only need to be formed while interposing an insulating layer within a circuit.

Example 6

Example 6 is also a modification of Example 1. In Example 6, a secondary battery cell 120 is a square-type secondary battery cell. Inside the secondary battery cell 120, a wound electrode body in which a positive electrode material and a negative electrode material are wound via a separator is housed. Then, as shown in (A) and (B) of FIG. 14 that are schematic perspective views of the secondary battery cell 120, an integrated circuit is arranged on an outer surface of the secondary battery cell 120. Specifically, an integrated circuit (more specifically, integrated circuit aggregate 50') or an integrated circuit 50 is bonded to the outer surface of the secondary battery cell 120. Further, a power source of the integrated circuit 50 is the secondary battery cell 120, and the integrated circuit 50 is connected to a positive electrode terminal 121 and a negative electrode terminal 122 of the secondary battery cell 120 via wiring 58. In an example shown in (A) of FIG. 14, information is transmitted in a wireless system, and the integrated circuit includes an antenna (not shown). As needed, a current measurement unit and a voltage measurement unit of the integrated circuit are connected to the positive electrode terminal 121 and the negative electrode terminal 122 via the wiring 58 in order to measure a current and a voltage. Alternatively, as shown in (B) of FIG. 14 that is a schematic perspective view of the secondary battery cell 120, information is transmitted in a wired system. Specifically, the integrated circuit 50 is connected to the positive electrode terminal 121 and the negative electrode terminal 122 of the secondary battery cell 120 via the wiring 58. The integrated circuit 50 is connected to a control circuit 90 via wiring 48 as in Example 1. Alternatively, as in Example 5, the integrated circuit 50 is connected to the control circuit 90 by the capacitive coupling and wiring. It should be noted that the integrated circuit 50 or the integrated circuit aggregate 50' is covered with shielding wiring as in Example 1, but the illustration of the shielding wiring is omitted in (A) and (B) of FIG. 14 and in FIG. 15 to be described next.

The secondary battery cell can be of a laminate type. As shown in FIG. 15 that is a schematic exploded perspective view, a secondary battery cell 220 has a laminated structure in which a separator 233 is inserted between a positive electrode material plate 231 and a negative electrode material plate 232 for the purpose of insulation and a plurality of laminates of them are laminated, and has the structure in which this laminated structure is vertically sealed with an aluminum laminate 234 together with an electrolytic solution. The positive electrode material plate 231 and the negative electrode material plate 232 are provided with a positive electrode terminal 221 and a negative electrode terminal 222, respectively. The positive electrode terminal 221 and the negative electrode terminal 222 protrude to the outside from a bonding portion of the aluminum laminate 234. The integrated circuit 50 or the integrated circuit aggregate 50' is connected to the positive electrode terminal 221 and the negative electrode terminal 222. The integrated circuit 50 or the integrated circuit aggregate 50' is located on an outer surface of the aluminum laminate 234. Then, a mode in which a power source of the integrated circuit 50 is the secondary battery cell and information is transmitted in a wireless system or a wired system can be provided. The integrated circuit and a battery pack of Example 6 can be applied as appropriate to each of Examples to be described below.

Example 7

Example 7 is also a modification of Example 1. In Example 7, an integrated circuit 50 is arranged on an outer surface of a secondary battery cell, which is the same as in Example 1, but a power source of the integrated circuit 50 is an external power source, and information is transmitted in a wired system or a wireless system.

FIG. 16 shows electrical signals in communication processing between the integrated circuit 50 and the control circuit 90 shown in (A) of FIG. 3. First, an external electrical signal including a preamble signal is transmitted from the control circuit 90 to the integrated circuit 50 via the communication circuit 93. On the integrated circuit 50 side, the transmitted external electrical signal is received, this external electrical signal is rectified, and power necessary to operate is held inside the integrated circuit 50. After that, a command and an ID number of a secondary battery cell 20 are transmitted from the control circuit 90 to the integrated circuit 50 via the communication circuit 93. On the integrated circuit 50 side, according to control signals (specifically, external electrical signals such as command and ID number), if the transmitted ID number matches an ID number of the integrated circuit itself, a signal processing unit 51 of this integrated circuit 50 transmits identification information and individual information stored in a memory unit 53 and information stored in a flag area of a storage area 52 to the control circuit 90. Such an operation and processing are sequentially performed on all the secondary battery cells 20. According to such a method, since the integrated circuit 50 obtains power necessary to operate based on the external electrical signal from the outside (specifically, control circuit 90), a power source unit is not required. Further, in this method, the ID number transmitted from the outside (specifically, control circuit 90) and the ID number of the integrated circuit itself are compared with each other, and in the case where the ID numbers match each other, a battery state is transmitted from the integrated circuit 50 provided to the secondary battery cell 20. Thus, each battery state within the battery pack 10 constituted of a large number of secondary battery cells 20 can be obtained without confusion.

Example 8

Example 8 relates to a secondary battery cell according to the second embodiment and the seventh embodiment of the present invention, a battery pack of the present invention in which the secondary battery cell according to the second embodiment and the seventh embodiment of the present invention is incorporated, and a power consumption device of the present invention in which the secondary battery cell according to the second embodiment and the seventh embodiment of the present invention is incorporated. In Example 8, an integrated circuit 50A is arranged on an outer surface of a secondary battery cell 20, a power source of the integrated circuit 50A is the secondary battery cell 20, and information is transmitted in a wired system. In other words, identification information and the like are transmitted to the outside of the secondary battery cell 20 (specifically, control circuit 90) by wires (specifically, via wiring 48). The integrated circuit 50A is connected to a positive electrode (specifically, battery lid 34) and a negative electrode (specifically, battery can 31) of the secondary battery cell 20 via wiring 58.

As shown in (A) of FIG. 17 that is a schematic perspective view of the secondary battery cell of Example 8 and in (B) of FIG. 17 that is a schematic partial end view of the integrated circuit and the like along with the arrow B-B of (A) of FIG. 17, the secondary battery cell of Example 8 includes the integrated circuit (IC chip) 50A that stores identification information. Then, the integrated circuit 50A includes a photodetection means (specifically, photo diode) 80. When the integrated circuit 50A is removed from the secondary battery cell 20, the photodetection means 80 detects light. Alternatively, the integrated circuit 50A includes a detection means for detecting that the integrated circuit 50A has been removed from the secondary battery cell 20. It should be noted that in (B) of FIG. 17, cross sections of a battery can and the like are shown to be flat, but actually, the cross sections of the battery can and the like are formed into an arc.

Specifically, the integrated circuit 50A is caused to adhere to the outer surface of the secondary battery cell 20 by using an adhesive such that the photodetection means 80 faces an outer surface of the integrated circuit 50A. In this state, light does not reach the photodetection means 80. For example, when the integrated circuit 50A is removed from the secondary battery cell 20 indoors or outdoors, the photodetection means 80 generally detects light. Then, when the photodetection means 80 detects light, the storage area 52 stores information indicating that the integrated circuit 50A has been removed from the secondary battery cell 20. Alternatively, when the detection means (specifically, photodetection means 80 in Example 8) detects that the integrated circuit 50A has been removed from the secondary battery cell 20, the storage area 52 stores information indicating that the integrated circuit 50A has been removed from the secondary battery cell 20. In other words, data (non-removal information) stored in the storage area 52 (specifically, flag area and error detection bit area) is deleted or rewritten. Alternatively, when the photodetection means 80 detects light or when the detection means detects that the integrated circuit 50A has been removed from the secondary battery cell 20, the integrated circuit 50A disconnects a fuse (or circuit disconnection means).

Except for the above points, the secondary battery cell of Example 8 has the same configuration and structure as those of the secondary battery cell of Example 1, and therefore detailed descriptions thereof will be omitted. It should be noted that the secondary battery cells described in Example 2 to Example 7 can be applied as appropriate to the secondary battery cell of Example 8.

As shown in FIG. 18 that is a schematic end view of the secondary battery cell, depending on circumstances, the integrated circuit 50A may be arranged inside the secondary battery cell 20. In this case, in a cylinder-type secondary battery cell 20 shown in FIG. 18, the integrated circuit 50A may be arranged in a space A located between an upper insulating plate 32 and a safety valve mechanism 35 provided inside the secondary battery cell 20 or in a space B located immediately below the battery lid 34. Then, the integrated circuit 50A only needs to be connected to a positive electrode lead 45 and a battery can 31 via wiring 59. Further, as shown in (A) and (B) of FIG. 19 and FIG. 20 that are schematic perspective views and a schematic exploded perspective view, in square-type secondary battery cells 120 and 220, the integrated circuit 50A only needs to be arranged in an appropriate space such as a gap surrounded by an insulating spacer arranged immediately below a sealing plate (cap plate) or a laminate portion. It should be noted that the aggregate of the integrated circuit 50A and an antenna is indicated as an integrated circuit aggregate (wireless IC tag) 50". Further, as an information output unit or the like of the integrated circuit arranged inside the secondary battery cell 20, 120, or 220, an information input/output terminal (see, for example, information input/output terminal 47 of (B) of FIG. 19) connected to the integrated circuit only needs to be provided to the secondary battery cell 20, 120, or 220. The secondary battery cells described in Example 2 to Example 7 can be applied as appropriate to such secondary battery cells 20, 120, and 220.

Example 9

Example 9 relates to a secondary battery cell according to the third embodiment and the seventh embodiment of the present invention, a battery pack of the present invention in which the secondary battery cell according to the third embodiment and the seventh embodiment of the present invention is incorporated, and a power consumption device of the present invention in which the secondary battery cell according to the third embodiment and the seventh embodiment of the present invention is incorporated. Also in Example 9, an integrated circuit 50B is arranged on an outer surface of a secondary battery cell 20, a power source of the integrated circuit 50B is the secondary battery cell 20, and information is transmitted in a wired system. In other words, identification information and the like are transmitted to the outside of the secondary battery cell 20 (specifically, control circuit 90) by wires (specifically, via wiring 48). The integrated circuit 50B is connected to a positive electrode (specifically, battery lid 34) and a negative electrode (specifically, battery can 31) of the secondary battery cell 20 via wiring 58.

As (A) of FIG. 21 that is a schematic perspective view of the secondary battery cell of Example 9 and in (B) of FIG. 21 that is a schematic partial end view of the integrated circuit and the like along with the arrow B-B of (A) of FIG. 21, the secondary battery cell of Example 9 includes the integrated circuit (IC chip) 50B that stores identification information. Then, the integrated circuit 50B includes a pressure detection means 81. When the integrated circuit 50B is removed from the secondary battery cell 20, the pressure detection means 81 detects a change in pressure. Alternatively, the integrated circuit 50B includes a detection stage for detecting that the integrated circuit 50B has been removed from the secondary battery cell 20. It should be noted that in (B) of FIG. 21, cross sections of the battery can and the like are shown to be flat, but actually, the cross sections of the battery can and the like are formed into an arc.

Specifically, the integrated circuit 50B is caused to adhere to the outer surface of the secondary battery cell 20 by using an adhesive such that the photodetection means 80 faces an outer surface of the integrated circuit 50B. In addition, the whole of the integrated circuit 50B is laminated with an exterior film 67. In this state, the pressure detection means 81 is in a state being applied with a pressure. When the integrated circuit 50B is removed from the secondary battery cell 20, the pressure detection means 81 enters a state being applied with no pressure. Then, when the pressure detection means 81 detects a change in pressure, a storage area 52 stores information indicating that the integrated circuit 50B has been removed from the secondary battery cell 20. Alternatively, when the detection means (specifically, pressure detection means 81 in Example 9) detects that the integrated circuit 50B has been removed from the secondary battery cell 20, the storage area 52 stores information indicating that the integrated circuit 50B has been removed from the secondary battery cell 20. In other words, data (non-removal information) stored in the storage area 52 (specifically, flag area and error detection bit area) is deleted or rewritten. Alternatively, when the pressure detection means 81 detects a change in pressure or the detection means detects that the integrated circuit 50B has been removed from the secondary battery cell 20, the integrated circuit 50B disconnects a fuse (or circuit disconnection means).

For example, as shown in (A) of FIG. 22 that is a schematic plan view and in (B) of FIG. 22 that is a schematic end view along the arrow B-B of (A) of FIG. 22, as the pressure detection means 81, an N-type silicon semiconductor substrate is etched to form diaphragm structure units, and P-type impurities are introduced into the diaphragm structure units to provide resistors $R_1$, $R_2$, $R_3$, and $R_4$ to the diaphragm structure units. When the diaphragm structure units receive a pressure and then deflected, a stress corresponding to a deflection amount is generated in each of the resistors $R_1$, $R_2$, $R_3$, and $R_4$. In proportion to this stress, a resistance value of the resistor is changed. Such a change in resistance value only needs to be measured using a Wheatstone bridge circuit shown in (C) of FIG. 22, with a voltage being set to $V_0$.

$$V_0 = i(R_1 * R_3 - R_2 * R_4)/(R_1 + R_2 + R_3 + R_4)$$

Alternatively, as shown in FIG. 23 that is a schematic partial plan view, in the case where a secondary battery cell 120 is fixed to a casing 17' with use of bolts 83 and a presser plate 84, the structure in which the pressure detection means 81 is interposed between the presser plate 84 and the secondary battery cell 120 may be provided.

Except for the above points, the secondary battery cell of Example 9 has the same configuration and structure as those of the secondary battery cell of Example 1, and therefore detailed descriptions thereof will be omitted. It should be noted that the secondary battery cells described in Example 2 to Example 8 can be applied as appropriate to the secondary battery cell of Example 9.

Example 10

Example 10 relates to a secondary battery cell according to the fourth embodiment and the seventh embodiment of the present invention, a battery pack of the present invention in which the secondary battery cell according to the fourth embodiment and the seventh embodiment of the present invention is incorporated, and a power consumption device of the present invention in which the secondary battery cell according to the fourth embodiment and the seventh embodiment of the present invention is incorporated.

A secondary battery cell of Example 10 includes an integrated circuit (IC chip) 50 that stores identification information.

The integrated circuit 50 includes a voltage measurement means (voltage measurement unit 56) for measuring a terminal voltage of a secondary battery cell 20.

When the integrated circuit 50 is removed from the secondary battery cell 20, the voltage measurement means detects a change in voltage. Here, the voltage measurement means (voltage measurement unit 56) is formed of a reference voltage generation circuit and a comparison circuit. One input unit of the comparison circuit is connected to a battery lid 34 of the secondary battery cell or a positive electrode terminal 121 or 221.

Generally, when the integrated circuit 50 is intended to be removed from the secondary battery cell 20, noise is added to a voltage supplied to the integrated circuit 50 or a large change is abruptly caused in a voltage supplied to the integrated circuit 50. In the secondary battery cell of Example 10, a battery terminal voltage in the battery state described in Example 2 is measured by the voltage measurement means (voltage measurement unit 56). When the voltage measurement means (voltage measurement unit 56) detects that predetermined noise is added to the battery terminal voltage or a predetermined change is caused therein, a storage area 52 stores information indicating that the integrated circuit 50 has been removed from the secondary battery cell. Alternatively, when a detection means (specifically, voltage measurement unit 56 in Example 10) detects that the integrated circuit 50 has been removed from the secondary battery cell 20, the storage area 52 stores information indicating that the integrated circuit 50 has been removed from the secondary battery cell 20. In other words, data (non-removal information) stored in the storage area 52 (specifically, flag area and error detection bit area) is deleted or rewritten. Alternatively, when the voltage measurement means detects a change in voltage or the detection means detects that the integrated circuit 50 has been removed from the secondary battery cell 20, the integrated circuit 50 disconnects a fuse (or circuit disconnection means).

Except for the above points, the secondary battery cell of Example 10 has the same configuration and structure as those of the secondary battery cell of Example 1, and therefore detailed descriptions thereof will be omitted. It should be noted that the secondary battery cells described in Example 2 to Example 9 can be applied as appropriate to the secondary battery cell of Example 10. Further, there may be provided a configuration in which the current measurement unit (current measurement circuit) 55 described in Example 2 is used instead of the voltage measurement means (voltage measurement unit 56), the integrated circuit 50 includes a current measurement means (current measurement unit 55) for measuring a battery current of the secondary battery cell 20, and when the integrated circuit 50 is removed from the secondary battery cell 20, the current measurement means detects a change in current.

Example 11

Example 11 relates to a secondary battery cell according to the fifth embodiment and the seventh embodiment of the present invention, a battery pack of the present invention in which the secondary battery cell according to the fifth embodiment and the seventh embodiment of the present invention is incorporated, and a power consumption device of the present invention in which the secondary battery cell according to the fifth embodiment and the seventh embodiment of the present invention is incorporated.

A secondary battery cell of Example 11 includes an integrated circuit (IC chip) that stores identification information.

The integrated circuit includes a resistance value measurement means for measuring a resistance value in the secondary battery cell.

When the integrated circuit is removed from the secondary battery cell, the resistance value measurement means detects a change in resistance value.

Specifically, the resistance value measurement means measures a resistance value of an electrolytic solution in the secondary battery cell. More specifically, in Example 11, the integrated circuit includes the resistance value measurement means formed of a measurement electrode for measuring a resistance value of the electrolytic solution and a resistance value measurement circuit. The measurement electrode is immersed in the electrolytic solution.

Generally, when the integrated circuit is intended to be removed from the secondary battery cell, the state of the measurement electrode immersed in the electrolytic solution is changed. Specifically, for example, the measurement electrode is extracted from the electrolytic solution. In the secondary battery cell of Example 11, when the resistance value measurement means detects a change in resistance value, a storage area stores information indicating that the integrated circuit has been removed from the secondary battery cell. Alternatively, when a detection means (specifically, resistance value measurement means in Example 11) detects that the integrated circuit has been removed from the secondary battery cell, the storage area stores information indicating that the integrated circuit has been removed from the secondary battery cell. In other words, data (non-removal information) stored in the storage area (specifically, flag area and error detection bit area) is deleted or rewritten. Alternatively, when the resistance value measurement means detects a change in resistance value or the detection means detects that the integrated circuit has been removed from the secondary battery cell, the integrated circuit disconnects a fuse (or circuit disconnection means).

Except for the above points, the secondary battery cell of Example 11 has the same configuration and structure as those of the secondary battery cell of Example 1, and therefore detailed descriptions thereof will be omitted. It should be noted that the secondary battery cells described in Example 2 to Example 10 can be applied as appropriate to the secondary battery cell of Example 11.

Example 12

Example 12 relates to a secondary battery cell according to the sixth embodiment and the seventh embodiment of the present invention, a battery pack of the present invention in which the secondary battery cell according to the sixth embodiment and the seventh embodiment of the present invention is incorporated, and a power consumption device of the present invention in which the secondary battery cell according to the sixth embodiment and the seventh embodiment of the present invention is incorporated.

A secondary battery cell of Example 12 includes an integrated circuit (IC chip) that stores identification information, as shown in (A) or (B) of FIG. 24 that are block diagrams of the integrated circuit.

The integrated circuit includes a monitor circuit 85 that monitors a clock frequency supplied from the outside.

When the integrated circuit is removed from the secondary battery cell, the monitor circuit 85 detects a change in clock frequency.

Generally, when the integrated circuit is intended to be removed from the secondary battery cell, the clock frequency supplied from the outside is changed. Specifically, an abnormal frequency is superimposed on the clock frequency or the supply of a clock signal is blocked. In the secondary battery cell of Example 12, when the monitor circuit 85 detects a change in clock frequency, a storage area stores information indicating that the integrated circuit has been removed from the secondary battery cell. Alternatively, when a detection means (specifically, monitor circuit 85 in Example 12) detects that the integrated circuit has been removed from the secondary battery cell, the storage area stores information indicating that the integrated circuit has been removed from the secondary battery cell. In other words, data (non-removal information) stored in the storage area (specifically, flag area and error detection bit area) is deleted or rewritten. Alternatively, when a resistance value measurement means detects a change in resistance value or the detection means detects that the integrated circuit has been removed from the secondary battery cell, the integrated circuit disconnects a fuse (or circuit disconnection means).

Except for the above points, the secondary battery cell of Example 12 has the same configuration and structure as those of the secondary battery cell of Example 1, and therefore detailed descriptions thereof will be omitted. It should be noted that the secondary battery cells described in Example 2 to Example 11 can be applied as appropriate to the secondary battery cell of Example 12.

Hereinbefore, the present invention has been described based on the preferred examples, but the present invention is not limited to those examples. The configuration, structure, connection relationship, and the like of the battery pack, the secondary battery cell, the integrated circuit, the control circuit, and the like described in Examples are mere examples and can be modified as appropriate. When the integrated circuit is arranged on the outer surface of the secondary battery cell, the integrated circuit arranged on the outer surface of the secondary battery cell may be covered with the same resin or the same type of resin as that constituting a package of the integrated circuit. With such a structure, the integrated circuit is integrated with a covering resin layer, which makes it extremely difficult to remove the integrated circuit from the secondary battery cell and substantially makes it impossible to remove the integrated circuit from the secondary battery cell. Even if the integrated circuit is intended to be removed from the secondary battery cell, the integrated circuit is broken. Depending on circumstances, there may be simultaneously adopted a configuration in which when an integrated circuit formed of a bare chip and provided with a groove portion formed thereon is mounted onto a substrate and the integrated circuit is removed from the substrate, the integrated circuit is broken from the groove portion. Alternatively, there may be adopted a configuration in which an integrated circuit formed of a bare chip is mounted onto a substrate, the substrate and the integrated circuit are connected to each other via a wire bonding portion, and when the integrated circuit is removed from the substrate, the wire bonding portion is broken. Alternatively, there may be adopted a configuration in which an integrated circuit is formed of a thin bare chip having a thickness of 50 µm or less and when the integrated circuit is removed, the integrated circuit is broken. In addition, those configurations may be combined with each other as appropriate.

As shown in (A) and (B) of FIG. 25 that are each a schematic partial cross-sectional view of the main body unit 11, the closure member (lid) 12, and the like, the structure in which the main body unit 11 constituting the battery pack 10 is made of a non-conductive material (insulating material), for example, made of a plastic material, and a bushing 14A formed of a conductive material, specifically, made of metal or an alloy (more specifically, stainless steel), is attached to a fixing unit of the main body unit 11 at which the fixing member 13 is attached. The bushing 14A is connected to the integrated circuit 50 via the first wiring 18. It should be noted that the first wiring 18 is attached to the bushing 14A by welding. The bushing 14A engages with the fixing member 13. It can be obtained by forming the bushing 14A and the main body unit 11 integrally with each other. Further, the closure member 12 is formed of a non-conductive material (insulating material), for example, made of a plastic material. The fixing member 13 attached to the closure member 12 is connected to the integrated circuit 50 via second wiring 19A and 19B and further via wiring not shown in the figure. Specifically, the fixing member 13 is grounded via the second wiring 19A and 19B and the wiring not shown in the figure, and one end of the wiring not shown in the figure is electrically connected to the second wiring 19A by an attachment screw (not shown) formed of stainless steel. At a part 19B of the second wiring, a through-hole 19C for passing the fixing member 13 therethrough is provided. It can be obtained by forming the second wiring 19A and 19B and the closure member 12 integrally with each other. The fixing member 13 is formed of a screw made of a conductive material (for example, metal or alloy), specifically, a screw made of stainless steel. Then, by detection of no conduction between the bushing 14A and the fixing member 13, it is possible to detect that the fixing member (screw) 13 has been removed from the fixing unit (bushing 14A provided with tap unit 14B) provided to the main body unit 11 and detect that the integrated circuit 50 provided to the secondary battery cell 20 has entered a state capable of being removed from the secondary battery cell 20. Then, it only needs to give a warning or the like to a user who uses the battery pack 10 and, depending on circumstances, stop the output from the battery pack 10.

DESCRIPTION OF SYMBOLS 10 battery pack
11 main body unit
12 closure member (lid)
13 fixing member (screw)
14, 14B tap unit
14A bushing
15 identification sign (serial ID)
16 output unit
17, 17' casing
18 first wiring
19A, 19B second wiring
19C through-hole
20, 120, 220 secondary battery cell
31 battery can
32 upper insulating plate
33 lower insulating plate
34 battery lid
35 safety valve mechanism
35A disk plate
36 heat sensitive resistance element (PTC element)
37 gasket
40 wound electrode body
41 positive electrode material
42 negative electrode material
43 separator
44 center pin
45 positive electrode lead
46 negative electrode lead
47 information input/output terminal
48 wiring (sensing wiring)
50, 50A, 50B integrated circuit
50', 50" integrated circuit aggregate as aggregate of integrated circuit and antenna
51 signal processing unit
52 storage area
53 memory unit
54 temperature measurement unit
55 current measurement unit
56 voltage measurement unit
57 antenna
58, 58', 59 wiring
60 wiring abnormality detection circuit
61 signal generation circuit
62 comparison circuit
63 AND circuit
64A, 64B, 64C terminal portion (pad portion)
65 film
66 shielding wiring
67 exterior film
68A, 68B opening portion
71 encryption processing unit
72 random number generator
73 capacitive coupling
74 abnormality detection wiring
75 bolt
76 contact unit
77 bushing
78 tap unit
79 secondary battery cell fixing unit
80 photodetection means
81 pressure detection means
82 silicon semiconductor substrate
83 bolt
84 presser plate
85 monitor circuit
90 control circuit
91 MPU
92 storage means
93 communication circuit
94 battery protection circuit
95 printed wiring board
121, 221 positive electrode terminal
122, 222 negative electrode terminal
231 positive electrode material plate
232 negative electrode material plate
233 separator
234 aluminum laminate

The invention claimed is:

1. A secondary battery cell, comprising:
an integrated circuit configured to store identification information,
wherein the integrated circuit is connected to a shielding wiring provided on the secondary battery cell, and
in an event the integrated circuit is removed from the secondary battery cell, the shielding wiring is configured to enter one of a non-conductive state or a short circuit state.

2. The secondary battery cell according to claim 1, wherein the integrated circuit comprises a wiring abnormality detection circuit connected to the shielding wiring, and in an event the integrated circuit is removed from the secondary battery cell, the wiring abnormality detection circuit is configured to detect a wiring abnormality.

3. The secondary battery cell according to claim 2, wherein in an event the secondary battery cell is removed from a secondary battery cell fixing unit, the shielding wiring is configured to enter one of the non-conductive state or the short circuit state.

4. The secondary battery cell according to claim 2, wherein the integrated circuit includes a storage area, and in an event the wiring abnormality detection circuit detects the wiring abnormality, the storage area is configured to store information indicating that the wiring abnormality is detected.

5. The secondary battery cell according to claim 2, further comprising a fuse, wherein in an event the wiring abnormality detection circuit detects the wiring abnormality, the integrated circuit is configured to disconnect the fuse.

6. A battery pack, comprising:
a plurality of secondary battery cells, wherein each secondary battery cell of the plurality of secondary battery cells comprises:
an integrated circuit configured to store identification information,
wherein the integrated circuit includes a wiring abnormality detection circuit,
in an event the integrated circuit is removed from the secondary battery cell, the wiring abnormality detection circuit is configured to detect a wiring abnormality, and
wherein the wiring abnormality detection circuit is connected to a shielding wiring that is provided on the secondary battery cell.

7. The secondary battery cell according to claim 1, wherein the identification information comprises an identification number (ID number) given to the integrated circuit.

8. A secondary battery cell, comprising:
an integrated circuit configured to store identification information,
wherein the integrated circuit includes a wiring abnormality detection circuit, and
in an event the integrated circuit is removed from the secondary battery cell, the wiring abnormality detection circuit is configured to detect a wiring abnormality, and
wherein the wiring abnormality detection circuit is connected to shielding wiring that is provided to the secondary battery cell.

9. The battery pack according to claim 6, further comprising a circuit configured to determine whether the integrated circuit is removed from the secondary battery cell based on the identification information from the integrated circuit.

10. The secondary battery cell according to claim 1, wherein the identification information comprises information to authenticate the secondary battery cell.

* * * * *